(12) United States Patent
Kondo et al.

(10) Patent No.: US 12,393,207 B2
(45) Date of Patent: Aug. 19, 2025

(54) AUTONOMOUS VEHICLE, CONVEYANCE OBJECT, AND CONTROL METHOD FOR AUTONOMOUS VEHICLE

(71) Applicant: Preferred Robotics, Inc., Tokyo (JP)

(72) Inventors: Yutaka Kondo, Tokyo (JP); Koji Terada, Tokyo (JP); Kenichi Hidai, Tokyo (JP)

(73) Assignee: Preferred Robotics, Inc., Tokyo (JP)

( * ) Notice: Subject to any disclaimer, the term of this patent is extended or adjusted under 35 U.S.C. 154(b) by 108 days.

(21) Appl. No.: 18/425,461

(22) Filed: Jan. 29, 2024

(65) Prior Publication Data

US 2024/0255961 A1 Aug. 1, 2024

(30) Foreign Application Priority Data

Jan. 31, 2023 (JP) ................................. 2023-012586

(51) Int. Cl.
| | |
|---|---|
| *G06K 19/06* | (2006.01) |
| *G05D 1/667* | (2024.01) |
| *G06T 7/73* | (2017.01) |
| *G06V 10/776* | (2022.01) |
| *G06V 20/56* | (2022.01) |
| *G05D 107/40* | (2024.01) |

(52) U.S. Cl.
CPC ............. *G05D 1/667* (2024.01); *G06T 7/73* (2017.01); *G06V 10/776* (2022.01); *G06V 20/56* (2022.01); *G05D 2107/40* (2024.01); *G06K 19/06028* (2013.01); *G06T 2207/30204* (2013.01); *G06T 2207/30252* (2013.01)

(58) Field of Classification Search
CPC ...... G05D 1/667; G05D 2107/40; G06T 7/73; G06T 2207/30204; G06T 2207/30252; G06V 10/776; G06V 20/56; G06K 19/06028
See application file for complete search history.

(56) References Cited

U.S. PATENT DOCUMENTS

| | | |
|---|---|---|
| 2019/0278281 A1 | 9/2019 | Sakai |
| 2023/0251668 A1 | 8/2023 | Yamana et al. |
| 2023/0259137 A1 | 8/2023 | Terada et al. |

FOREIGN PATENT DOCUMENTS

| | | |
|---|---|---|
| JP | 2019-148881 | 9/2019 |
| JP | 2021-086205 | 6/2021 |
| JP | 2022-144293 | 10/2022 |

(Continued)

OTHER PUBLICATIONS

Asahi Kasei, corporate website, Jan. 30, 2023 version, <URL:https://asahi-kasei-ces.com/>.

(Continued)

*Primary Examiner* — Mathew Franklin Gordon
(74) *Attorney, Agent, or Firm* — IPUSA, PLLC

(57) ABSTRACT

An autonomous vehicle includes one or more sensors configured to obtain one or more images of a conveyance target that includes one or more markings; and a controller configured to control the autonomous vehicle. The controller includes one or more processors, and one or more memories storing one or more programs, which when executed, cause the one or more processors to identify the conveyance target based on a recognition result of the one or more markings included in the one or more images, and control conveyance of the conveyance target by the autonomous vehicle based on an identification result of the conveyance target.

20 Claims, 22 Drawing Sheets

(56) References Cited

FOREIGN PATENT DOCUMENTS

| JP | 1753889 | 9/2023 |
|----|---------|--------|
| JP | 1755673 | 10/2023 |
| JP | 2023-184159 | 12/2023 |
| WO | 2022/085625 | 4/2022 |
| WO | 2022/085626 | 4/2022 |

OTHER PUBLICATIONS

Asahi Kasei, product introduction on corporate website, "Smart Cloak Gateway", Mar. 1, 2023 version, <URL:https://asahi-kasei-ces.com/products/smart-cloak-gateway/>.

Asahi Kasei, news on corporate website, "Proposal of future life using AI robot through CES 2023" dated Jan. 27, 2023, Mar. 1, 2023 version, <URL:https://www.asahi-kasei.co.jp/j-koho/press/20230127/index/>.

PR Times, web article about Asahi Kasei Homes Corporation released on Jan. 27, 2023, "Proposal of future life using AI robot through CES 2023", Jan. 28, 2023 version <URL:https://prtimes.jp/main/html/rd/p/000000061.000073738.html>.

Japanese Patent Application No. 2023-012700 filed on Jan. 31, 2023.

Japanese Patent Application No. 2023-012583 filed on Jan. 31, 2023.

Japanese Patent Application No. 2023-012584 filed on Jan. 31, 2023.

Japanese Patent Application No. 2023-012701 filed on Jan. 31, 2023.

Japanese Patent Application No. 2023-012585 filed on Jan. 31, 2023.

U.S. Appl. No. 18/425,478, filed Jan. 29, 2024.

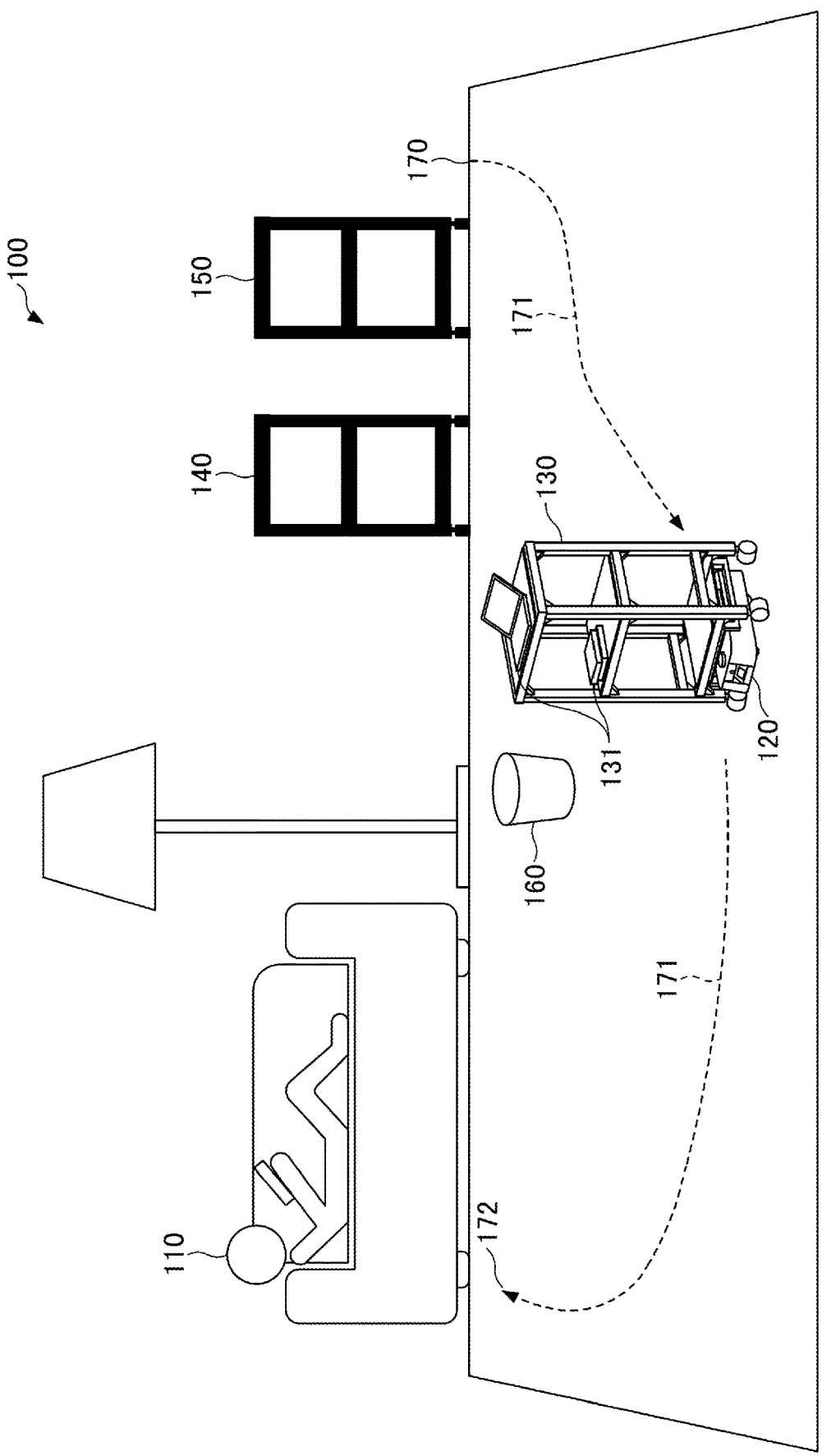

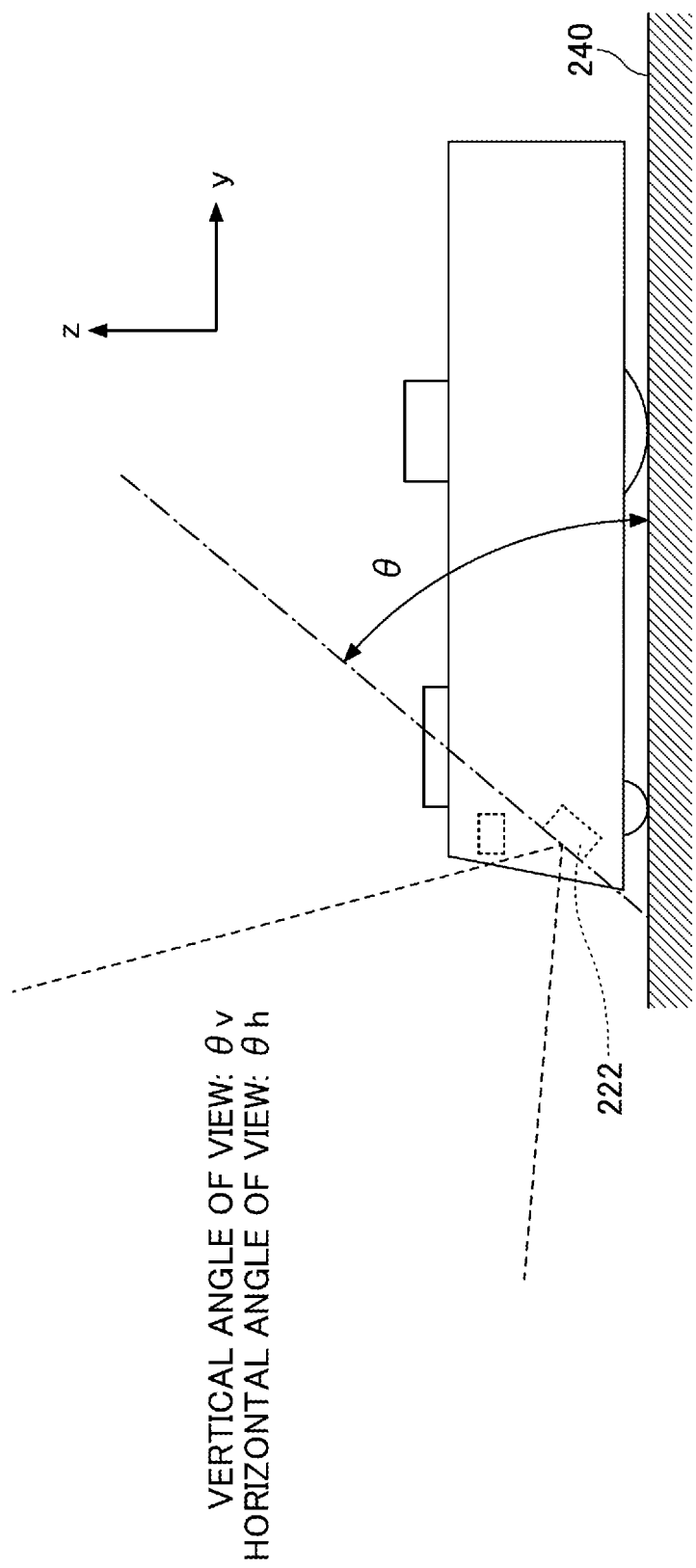

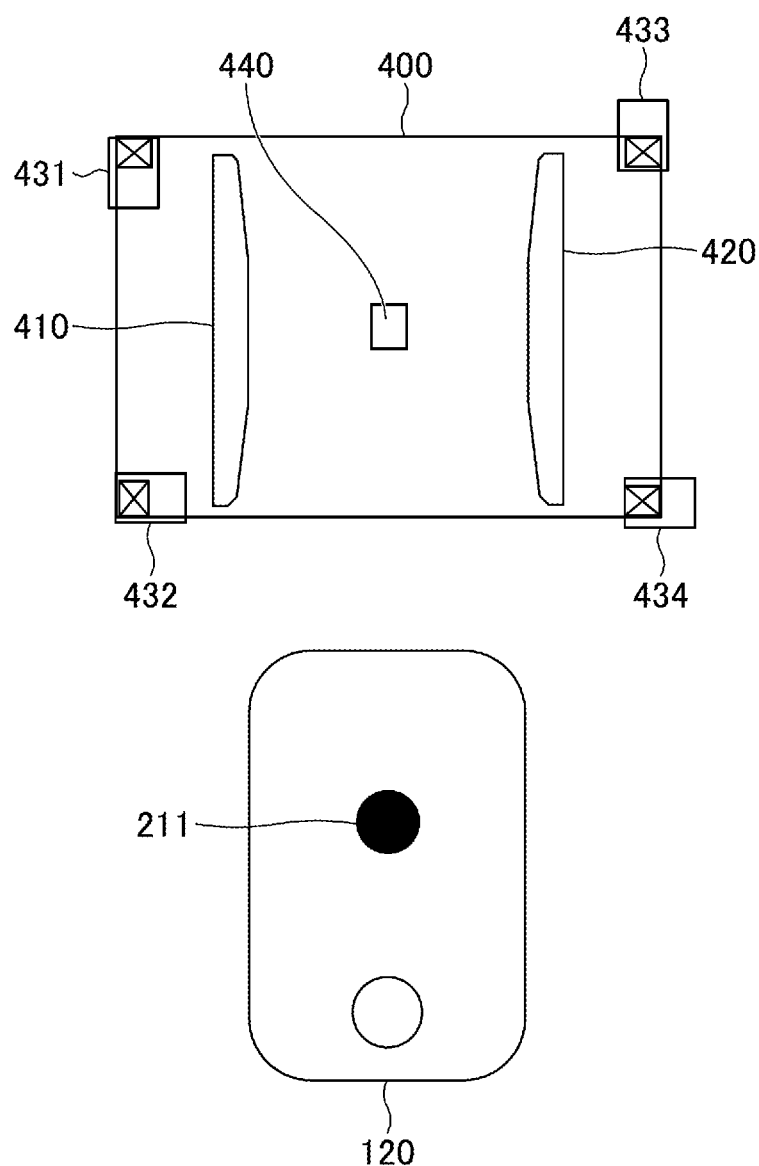

FIG.13

| ID | TYPE | SHELVING UNIT INFORMATION | | | | ITEM | TAG |
|---|---|---|---|---|---|---|---|
| | | DIMENSIONS | INITIAL POSITION | RELEASE POSITION | DOCKING POSITION | | |
| 12345678 | SHELVING UNIT A | W1*D1*H1 | (x1,y1,θ1) | (x2,y2,θ2) | (x3,y3,θ3) | LAPTOP COMPUTER | WORK TOOL |
| | | | | | | STATIONERY | WORK TOOL |
| | | | | | | PAPERBACK | HOBBY |
| 98765432 | SHELVING UNIT B | W2*D2*H2 | (x11,y11,θ11) | (x12,y12,θ12) | (x13,y13,θ13) | SEASONING | MEAL SET |
| | | | | | | CUTLERY | MEAL SET |
| | | | | | | SNACK | DISCRETIONARY ITEM |
| ... | ... | ... | ... | ... | ... | ... | ... |

900

AUTONOMOUS VEHICLE, CONVEYANCE OBJECT, AND CONTROL METHOD FOR AUTONOMOUS VEHICLE

CROSS-REFERENCE TO RELATED APPLICATIONS

This application is based on and claims priority to Japanese Patent Application No. 2023-012586, filed on Jan. 31, 2023, the entire contents of which are incorporated herein by reference.

BACKGROUND

1. Technical Field

The present disclosure relates to: autonomous vehicles; conveyance objects, which are objects to be conveyed; and control methods for autonomous vehicles.

2. Description of the Related Art

Autonomous vehicles, such as automatic guided vehicles and the like, can autonomously convey conveyance targets without being driven by users, e.g., shelving units, towing trollies, and the like, on which items are placed. When the autonomous vehicle accurately recognizes the outer dimensions of the conveyance target that is being conveyed, the autonomous vehicle can avoid collision with the surrounding objects and efficiently convey the conveyance target (see, for example, Japanese Laid-Open Patent Publication No. 2019-148881).

SUMMARY

An autonomous vehicle according to one aspect of the present disclosure includes: one or more sensors configured to obtain one or more images of a conveyance target that includes one or more markings; and a controller configured to control the autonomous vehicle. The controller includes one or more processors, and one or more memories storing one or more programs, which when executed, cause the one or more processors to: identify the conveyance target based on a recognition result of the one or more markings included in the one or more images, and control conveyance of the conveyance target by the autonomous vehicle based on an identification result of the conveyance target.

BRIEF DESCRIPTION OF THE DRAWINGS

FIG. 1 illustrates an example of a scenario in which an autonomous vehicle is used;

FIGS. 2A and 2B are views illustrating an example of an external configuration of the autonomous vehicle;

FIGS. 7A to 7C are views illustrating an example of driving of the docking mechanism upon docking;

FIG. 13 is a view illustrating an example of a conveyance target management table;

DETAILED DESCRIPTION

Figure 2A:
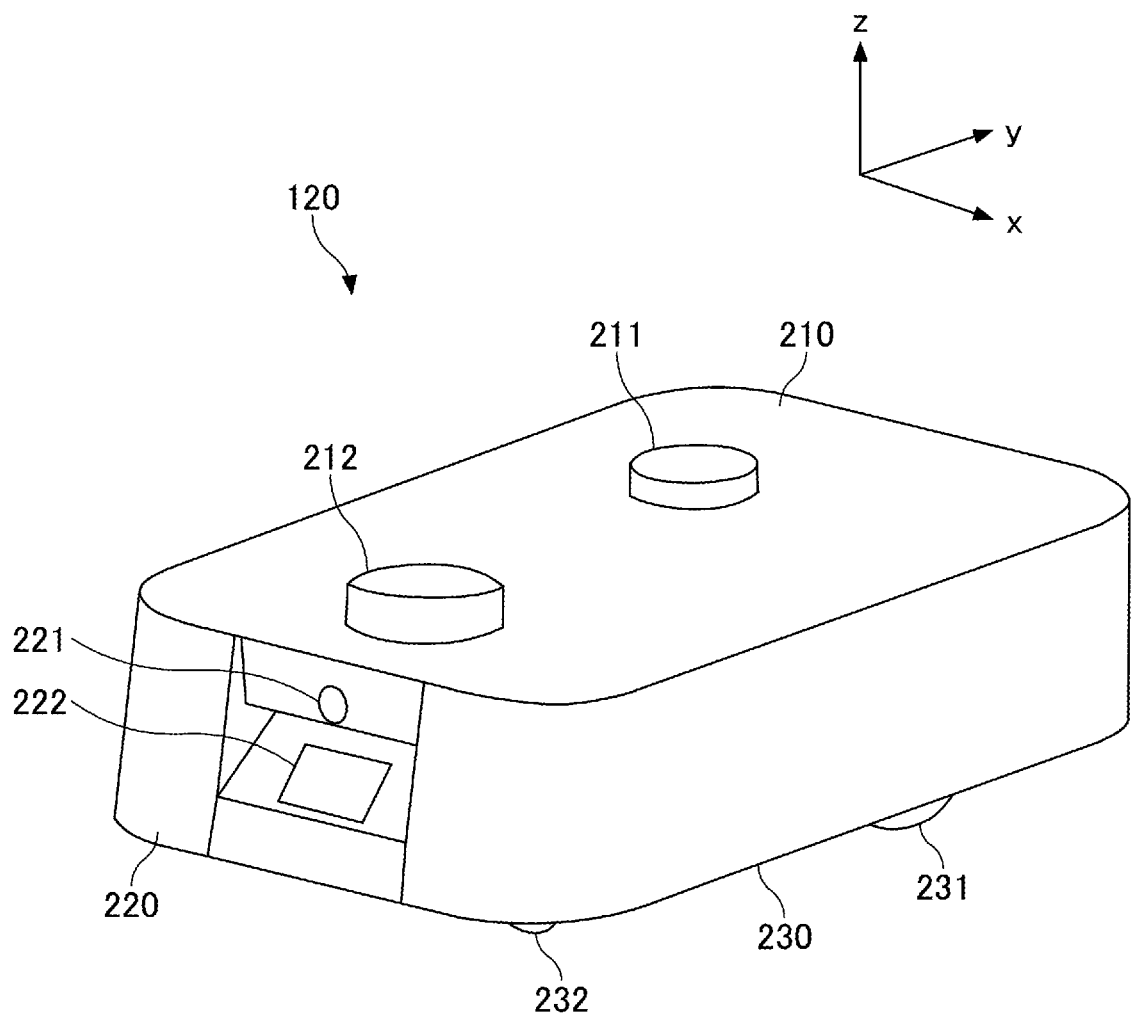

The present disclosure provides an autonomous vehicle that can readily obtain information on the conveyance target.

Embodiments will be described hereinafter with reference to the accompanying drawings. Note that in the present specification and drawings, the components having substantially the same functional configurations are given the same symbols, and duplicate description thereof will be omitted.

Note in the following description that, an x direction, a y direction, and a z direction are directions that are perpendicular to each other. The x direction and the y direction are horizontal directions, and the z direction is a vertical direction. The x direction is a width direction of the autonomous vehicle. The y direction is a front-rear direction of the autonomous vehicle. The z direction is a height direction of the autonomous vehicle. Also, for the sake of convenience in the following, a positive x-direction side may be referred to as a right side, a negative x-direction side may be referred to as a left side, a positive y-direction side may be referred to as a rear side, a negative y-direction side may be referred to as a front side, a positive z-direction side may be referred to as an upper side, and a negative z-direction side may be referred to as a lower side.

EMBODIMENTS

<Scenario in which Autonomous Vehicle is Used>

First, a scenario in which the autonomous vehicle according to the embodiment is used will be described. FIG. 1 is a view illustrating an example of a scenario in which the autonomous vehicle is used. As illustrated in FIG. 1, an autonomous vehicle 120 may be used in, for example, a scenario where a user 110 is relaxing on a sofa in a predetermined space 100, such as a living room of a home.

The scenario in FIG. 1 illustrates a case in which, for example, the user 110 has uttered a wake word and has subsequently uttered, "Bring me the laptop" to the autonomous vehicle 120 in order to use a laptop computer. In other words, FIG. 1 illustrates a case in which a voice-based conveyance instruction (hereinafter may be referred to as a voice instruction) is performed. In this case, the autonomous vehicle 120 may identify, from among caster-equipped shelving units 130 to 150 (examples of the conveyance object), the shelving unit 130, as the conveyance target, that is conveying work tools 131, such as a laptop computer, books, and the like, and may convey the shelving unit 130 to a position near the user 110 upon docking with the shelving unit 130. Note that the autonomous vehicle 120 may be configured to follow a voice instruction that is given without a wake word.

The autonomous vehicle 120 may also be configured to follow a conveyance instruction given by the user 110 who operates a dedicated application with an information process terminal, such as a smartphone, a tablet, or the like. Such a conveyance instruction is also known as a terminal-based conveyance instruction (hereinafter referred to as an operation instruction). In this case, the autonomous vehicle 120 connects to the information process terminal of the user 110 via a communication network, such as a wireless local area network (LAN), a near field communication, or the like, and receives a control signal indicating the conveyance instruction from the information process terminal.

Using the autonomous vehicle 120 in this manner allows the user 110 to simply give a voice-based conveyance instruction or a terminal-based conveyance instruction to bring a laptop computer that is in a remote location to be within a grasping distance of the user. Thus, the user is able to obtain the laptop computer without having to move from the sofa.

Note that the example of FIG. 1 illustrates a case in which the shelving unit 130 is standing by at the position of an anchor 170 in the predetermined space 100 at the point when the user 110 gave the conveyance instruction. Furthermore, the example of FIG. 1 illustrates a case in which a trash can 160 is present as an obstacle on the shortest conveyance path used when the shelving unit 130, which is standing by at the position of the anchor 170, is conveyed to a position 172 near the user 110.

In such a case, the autonomous vehicle 120 may detect the trash can 160 during conveyance of the shelving unit 130, and may convey the shelving unit 130 along a conveyance path that is indicated by a dotted arrow 171 to avoid collision with the trash can 160.

Further, although not illustrated in FIG. 1, assuming a case in which, for example, after the autonomous vehicle 120 has conveyed the shelving unit 130 to the position 172 near the user 110 and the user 110 has taken the laptop computer out from the shelving unit 130, the user 110 gives a voice instruction to the autonomous vehicle 120 by uttering, "Return the shelving unit back to its original place." In this case, the autonomous vehicle 120 conveys the shelving unit 130 to the position of the anchor 170. Note that the conveyance instruction to return the shelving unit back to its original place may be given by the terminal-based conveyance instruction.

Further, although the example of FIG. 1 illustrated a case in which the autonomous vehicle 120 conveys the shelving unit 130 as the conveyance target, the autonomous vehicle 120 may identify and convey the shelving unit 140 or the shelving unit 150 depending on the contents of the conveyance instruction given by the user 110. Furthermore, the example of FIG. 1 illustrated a case in which the autonomous vehicle 120 identified a position near the user 110 as the conveyance destination position of the shelving unit 130. However, depending on the contents of the conveyance instruction given by the user 110, a position near a predetermined disposed object (for example, a piece of furniture) in the predetermined space 100 or a given position in the predetermined space 100 may be identified as the conveyance destination position of the shelving unit 130 by the autonomous vehicle 120.

<External Configuration of Autonomous Vehicle>

The external configuration of the autonomous vehicle 120 will be described next. FIG. 2A is a view illustrating an example of the external configuration of the autonomous vehicle.

As illustrated in FIG. 2A, the autonomous vehicle 120 may have a rectangular cuboid shape as a whole, and its dimensions in a height direction (z-axis direction) and a width direction (x-axis direction) may be defined so as to allow the autonomous vehicle 120 to enter below the bottom shelf (the bottom) of a shelving unit to be a conveyance target (hereinafter may be referred to as a "conveyance-target shelving unit"). Note that the shape of the autonomous vehicle 120 is not limited to a rectangular cuboid.

A locking device 211, which is a component of a docking mechanism used to dock with the conveyance-target shelving unit, is disposed on an upper surface 210 of the autonomous vehicle 120. A LiDAR device 212 is disposed on the upper surface 210 of the autonomous vehicle 120. The measurement range of the LiDAR device 212 may cover the front-rear direction (y-axis direction) and the width direction (x-axis direction) at a position equal in height to the upper surface 210 of the autonomous vehicle 120. An obstacle or the like that is present in the measurement range can be detected by using the measurement result of the LiDAR device 212.

A front RGB camera 221 and a time-of-flight camera (ToF camera) 222 are disposed at a front surface 220 of the autonomous vehicle 120. Note that although the front RGB camera 221 of the present embodiment is disposed on the upper side with respect to the ToF camera 222, the disposition position of the front RGB camera 221 is not limited to this position.

When the autonomous vehicle 120 moves in the forward direction, the front RGB camera 221 captures and outputs color images of, for example, a shelving unit (for example, the shelving unit 130) that is to be the conveyance target, a user (for example, the user 110) who is near the conveyance destination, a disposed object that is near the conveyance destination, an obstacle (for example, the trash can 160) on the conveyance path, and the like.

The ToF camera 222 is an example of a range image sensor. In order to avoid multipath interference, the ToF camera 222 is disposed facing upward on the front surface 220 of the autonomous vehicle 120 to an extent that the surface (a floor 240 illustrated in FIG. 2B) on which the autonomous vehicle 120 travels is not included in the measurement range. An example of multipath interference is a state in which light emitted from a light source is reflected by another target object via the floor 240 and a reduction in measurement accuracy is caused due to the ToF camera 222 receiving the reflected light. In the present embodiment, an upward disposition angle θ of the ToF camera 222 on the front surface 220 of the autonomous vehicle 120 is approximately 50 degrees with respect to the floor 240.

Further, when the autonomous vehicle 120 moves in the forward direction, the ToF camera 222 captures a range image (depth image) of an obstacle or the like by setting at least an area to be passed by the docked shelving unit (that is, an area corresponding to the height of the docked shelving unit×the width of the docked shelving unit) as the measurement range, and outputs the captured range image (depth image). Note that in the present embodiment, the ToF camera 222 have a vertical angle of view θv of 70 degrees and a horizontal angle of view θh of 90 degrees.

A drive wheel 231 and a non-drive wheel 232 are disposed on a lower surface 230 of the autonomous vehicle 120, thereby supporting the autonomous vehicle 120.

The drive wheel 231 is disposed at both sides in the width direction (x-axis direction) (a total of two drive wheels 231 are disposed in the width direction). When the drive wheels 231 are each independently motor-driven, the drive wheels 231 may cause the autonomous vehicle 120 to move in a forward and backward direction (y-axis direction). The drive wheels 231 may also cause the autonomous vehicle 120 to turn about the z axis.

The non-drive wheel 232 may be provided on each side in the width direction (x-axis direction) (that is, a total of two non-drive wheels may be provided along the width direction). Each of the non-drive wheels 232 may also be provided to be able to turn about the z axis with respect to the autonomous vehicle 120. Note that the disposition positions and number of non-drive wheels 232 may be other than those described above.

<Details of Configurations of Interior and Lower Surface of the Autonomous Vehicle>

Figure 3A:
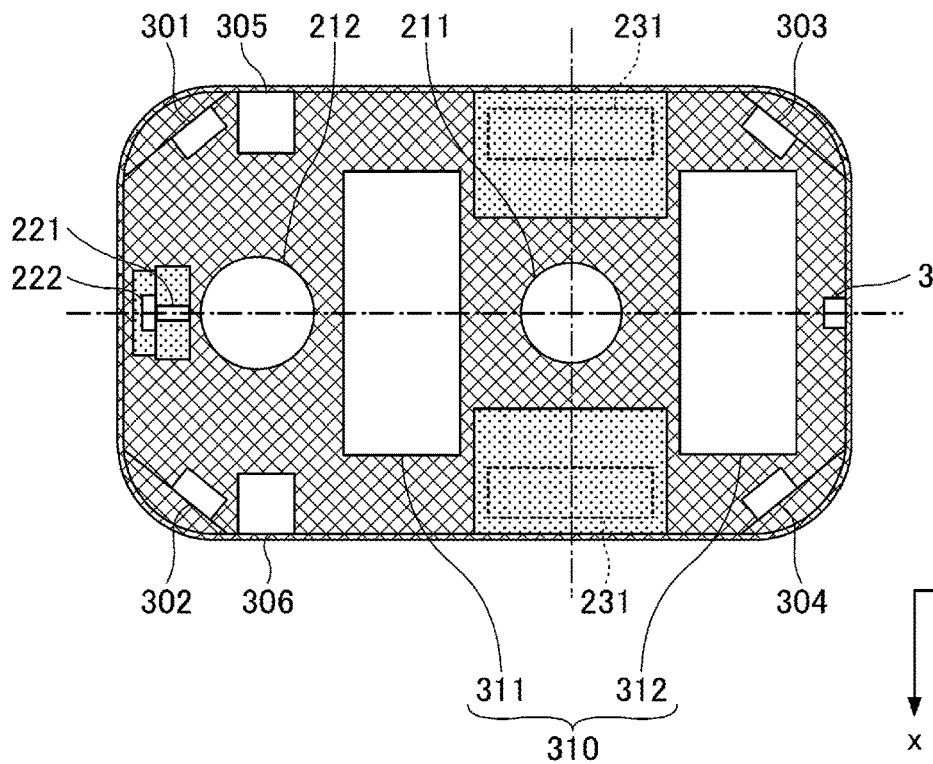
FIGS. 3A and 3B are views illustrating an example of configurations of an interior and a lower surface of the autonomous vehicle.
Figure 3B:
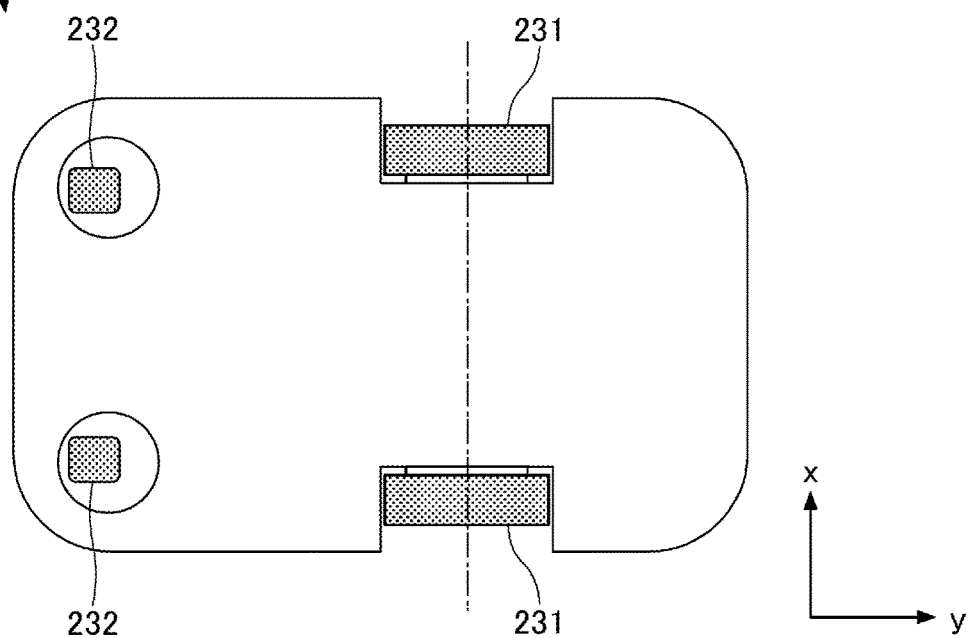

Details of the configurations of the interior and the lower surface of the autonomous vehicle will be described next. FIGS. 3A and 3B are views illustrating an example of the configurations of the interior and the lower surface of the autonomous vehicle.

FIG. 3A illustrates the interior of the autonomous vehicle 120 as viewed from directly above, with an upper cover of the autonomous vehicle 120 being removed. The components of the interior of the autonomous vehicle 120 will be described hereinafter with reference to FIG. 3A.

(a-1) First Control Circuit Board and Second Control Circuit Board

The first control circuit board and the second control circuit board will be described first. As illustrated in FIG. 3A, the autonomous vehicle 120 includes a first control circuit board 311 and a second control circuit board 312. In the present embodiment, the first control circuit board 311 controls, for example, electronic devices, and the second control circuit board 312 controls, for example, drive devices. Note that, however, the division of the roles of the first control circuit board 311 and the second control circuit board 312 is not limited to this.

Note that the example of FIG. 3A illustrates a case in which the first control circuit board 311 and the second control circuit board 312 are provided separately. However, the first control circuit board 311 and the second control circuit board 312 may also be provided integrally as a single circuit board. Regardless of whether the first control circuit board 311 and the second control circuit board 312 are disposed separately or integrally, a device having both of the functions of the first control circuit board 311 and the functions of the second control circuit board 312 is referred to as the controller 310 in the present embodiment.

(a-2) Docking Mechanism

The docking mechanism will be described next. As illustrated in FIG. 3A, the autonomous vehicle 120 includes the locking device 211 that is movable upward and downward, as a docking mechanism for docking with a shelving unit that is to be the conveyance target. Note that although the docking mechanism according to the present embodiment uses a solenoid locking device, the raising and lowering of the locking device may be performed by an electromagnetic actuator other than a solenoid or by another type of actuator, such as a rack and pinion mechanism, a trapezoidal thread mechanism, or a pneumatic drive mechanism.

A specific configuration of the locking device 211 is disclosed in, for example, the following Reference Document 1.

[Reference Document 1] Japanese Laid-Open Patent Publication No. 2022-144293

In the present embodiment, the locking device 211 is disposed at the center position in the width direction (x-axis direction) of the drive wheels 231 provided such that one drive wheel is on each side in the width direction (x-axis direction). In addition, the locking device 211 is disposed on the rotational axes of the drive wheels 231 (see the chain lines in FIGS. 3A and 3B).

The locking device 211 includes a compression coil spring. When a solenoid is turned on, the locking device 211 is moved downward, causing the compression coil spring to contract. When the solenoid is turned off, the locking device 211 moves upward (in the z-axis direction; toward the front side of the drawing in the case of FIG. 3A) by the compression force of the compression coil spring. Note that the controller 310 controls the solenoid to be turned on or off.

The locking device 211 determines whether or not the recess of the locking device 211 can be engaged with a projection (described below in detail) attached to a conveyance-target shelving unit when the autonomous vehicle 120 enters below the bottom shelf of the conveyance-target shelving unit.

The autonomous vehicle 120 may turn off the solenoid when it is determined that the locking device 211 can be moved upward. Note that although the photoreflector is used to detect the state in which the locking device 211 and the projection are facing each other in the present embodiment, the detection may be performed by a method using a component other than the photoreflector. A method using a component other than the photoreflector is, for example, a method using a camera, a physical switch, a magnetic sensor, an ultrasonic sensor, or the like.

Consequently, the locking device 211 is moved to the projection, and the locking device 211 is engaged with the projection. As a result, the docking of the autonomous vehicle 120 with the conveyance-target shelving unit is completed.

Note that, as described above, the drive wheels 231 are provided such that one drive wheel is on each side in the width direction (x-axis direction), and the locking device 211 is provided at the center position of the drive wheels 231 in the width direction (x-axis direction). In other words, the locking device 211 is provided symmetrically in the width direction. Thus, when entering below the bottom shelf of the conveyance-target shelving unit, the autonomous vehicle 120 can enter in a forward direction or in a backward direction.

When the solenoid is turned on to move the locking device 211 downward in a state in which the autonomous vehicle 120 is docked with the conveyance-target shelving unit, the autonomous vehicle 120 is undocked from the conveyance-target shelving unit.

(a-3) Various Input and Output Devices

Various input and output devices will be described next. As illustrated in FIG. 3A, in addition to the LiDAR device 212, the front RGB camera 221, and the ToF camera 222 that are described above, the autonomous vehicle 120 includes various types of input and output devices, such as a rear RGB camera 320, microphones 301 to 304, and loudspeakers 305 and 306.

As the disposition positions, the disposition directions, the measurement ranges, the measurement targets, and the like of the LiDAR device 212, the front RGB camera 221, and the ToF camera 222 have already been described, description thereof will be omitted here.

When the autonomous vehicle 120 moves in the backward direction, the rear RGB camera 320 captures and outputs color images of, for example, the conveyance-target shelving unit (for example, the shelving unit 130), an obstacle in the periphery of the conveyance-target shelving unit, and the like.

Note that the front RGB camera 221 and the rear RGB camera 320 may output grayscale images instead of color images. The front RGB camera 221 and the rear RGB camera 320 may be a stereo camera.

The microphones 301 to 304 are examples of audio input devices. The microphones 301 to 304 are provided at the four corners (two on the front side and two on the rear side) of the autonomous vehicle 120 to detect sound from the respective directions. By providing the microphones 301 to 304 at the four corners of the autonomous vehicle 120 in this manner, the direction in which the user 110 who gave the voice instruction is present can be determined with respect to the current position and orientation of the autonomous vehicle 120, thus allowing estimation of the position of the user 110.

The loudspeakers 305 and 306 are examples of audio output devices, and provide a voice output in the lateral direction of the autonomous vehicle 120. The loudspeakers 305 and 306 provide, for example, a voice output to confirm the contents of a task recognized by the autonomous vehicle 120 in response to a voice instruction given by the user 110.

FIG. 3B illustrates the lower surface of the autonomous vehicle 120. The components of the lower surface of the autonomous vehicle 120 will be described hereinafter with reference to FIG. 3B.

(b-1) Drive Wheels

The drive wheel 231 will be described first. As illustrated in FIG. 3B, the autonomous vehicle 120 includes the drive wheels 231 that are provided such that one drive wheel is present on each side in the width direction (x-axis direction). As described above, the drive wheel 231 may be each independently motor-driven to move the autonomous vehicle 120 in the forward-backward direction (y-axis direction) and to cause the autonomous vehicle 120 to turn about the z axis.

Specifically, the autonomous vehicle 120 can be moved in the forward direction by rotating both of the drive wheels 231 forward, and the autonomous vehicle 120 can be moved in the backward direction by reversing both of the drive wheels 231. Further, the autonomous vehicle 120 can turn by rotating one of the drive wheels 231 forward and rotating the other in reverse.

Note that as described above, the rotational axis of one of the drive wheels 231 and the rotational axis of the other are coaxially formed, and the locking device 211 is provided on the co-axis at the center position between one drive wheel 231 and the other drive wheel 231. Therefore, when one drive wheel 231 is rotated forward and the other drive wheel 231 is rotated in reverse, the autonomous vehicle 120 is able to turn about the locking device 211.

(b-2) Non-Drive Wheels

The non-drive wheel 232 will be described next. As illustrated in FIG. 3B, the autonomous vehicle 120 includes the non-drive wheels 232 that are provided such that one non-drive wheel is on each side in the width direction (x-axis direction). As described above, each of the non-drive wheels 232 is provided so as to be able to turn about the z axis. Thus, for example, when the autonomous vehicle 120 is to make a turn after moving in the forward direction or the backward direction, the non-drive wheels 232 can be oriented to immediately follow in the direction of the turn. Furthermore, for example, when the autonomous vehicle 120 is to move in the forward direction or the backward direction after making a turn, the non-drive wheels 232 can be oriented to immediately follow in the forward or backward direction.

<Outline of Docking>

Figure 4A:
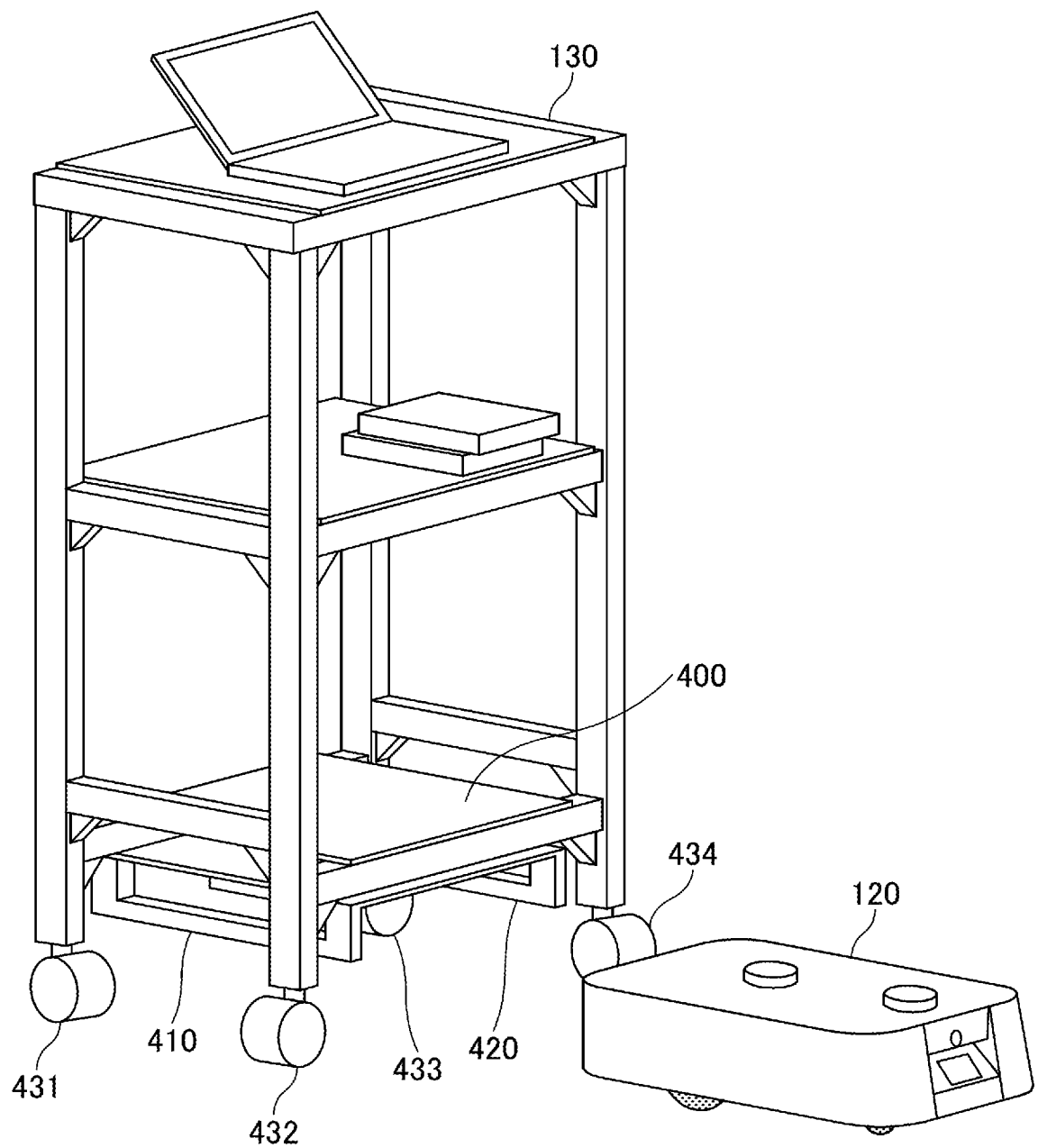
FIGS. 4A and 4B are views illustrating a state in which the autonomous vehicle is docked with a shelving unit that is to be a conveyance target.
Figure 4B:
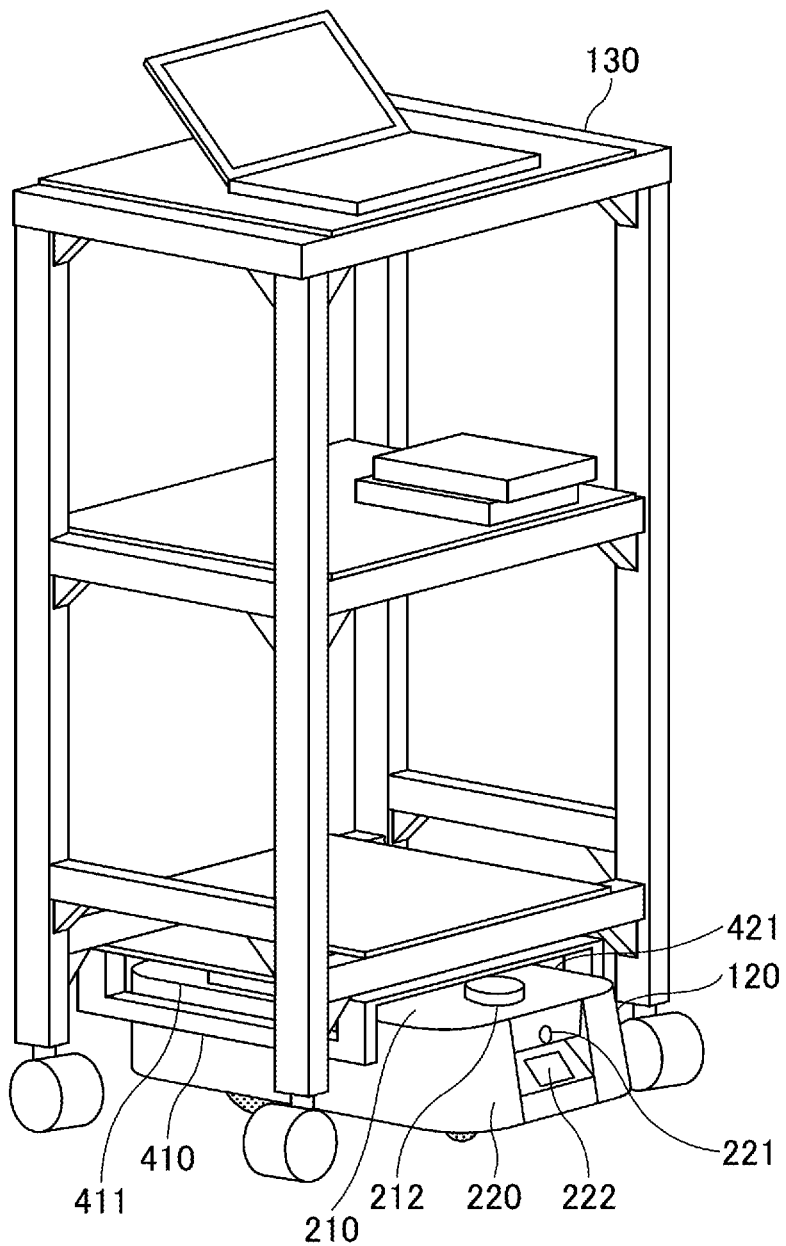

The outline of the docking will be described next. FIGS. 4A and 4B are views illustrating a state in which the autonomous vehicle is docked with the conveyance-target shelving unit. FIG. 4A is a view illustrating a state immediately before the autonomous vehicle 120 is docked with the conveyance-target shelving unit 130 that is standing by at the position of the anchor 170.

As illustrated in FIG. 4A, the shelving unit 130 includes three shelves. Frame guides 410 and 420 are attached on the underside of a bottom shelf 400 so as to be substantially parallel to each other with a space corresponding to the width of the autonomous vehicle 120 provided therebetween. This configuration can define the entry direction when the autonomous vehicle 120 is to enter below the bottom shelf 400 of the conveyance-target shelving unit 130. Further, the frame guides 410 and 420 may function as guides in the width direction when the autonomous vehicle 120 is to convey the conveyance-target shelving unit 130, thereby preventing the shelving unit 130 from shifting in the width direction relative to the autonomous vehicle 120.

The entry direction is an entry direction that creates a state in which the autonomous vehicle 120 can convey the conveyance target. The state in which the autonomous vehicle 120 can convey the conveyance target includes a state in which the autonomous vehicle 120 is docked with the conveyance target. The state in which the autonomous vehicle 120 can convey the conveyance target also includes a state in which the autonomous vehicle can convey the conveyance target, for example, by pushing, lifting, gripping, loading, towing, or the like. The term "conveyance" includes transferring the conveyance target to a different place by the autonomous vehicle. Note that in the present embodiment, the expression "entry direction" is used because the autonomous vehicle 120 enters below the bottom shelf 400 for docking with the shelving unit 130. However, in an embodiment that creates a state in which the autonomous vehicle 120 can convey the conveyance target without entry into the conveyance target, the expression "traveling direction" may be used.

In addition, casters 431 to 434 may be rotatably attached to the feet of the shelving unit 130. Such a configuration can allow the autonomous vehicle 120 to readily convey the docked shelving unit 130.

FIG. 4B is a view illustrating a state after the autonomous vehicle 120 is docked with the conveyance-target shelving unit 130. As illustrated in FIG. 4B, the front surface 220 of the autonomous vehicle 120 juts out from the shelves of the shelving unit 130 in the forward direction, and is not covered by the shelves of the shelving unit 130. However, depending on the shape or dimensions of the shelving unit 130, the measurement range of at least one of the front RGB camera 221, the ToF camera 222, the LiDAR device 212, or the rear RGB camera 320 may be obstructed by the components of the shelving unit 130 (e.g., the shelves, pillars, casters, and the like). Therefore, in the present embodiment, the shape and dimensions of the shelving unit 130 are identified, and an invalid region may be set in the measurement range of at least one of the front RGB camera 221, the ToF camera 222, the LiDAR device 212, or the rear RGB camera 320.

Note that the measurement range of the LiDAR device 212 in the width direction may be obstructed by the frame guides 410 and 420 or the components of the shelving unit 130 in a state in which the autonomous vehicle 120 is docked with the shelving unit 130.

Therefore, the frame guides 410 and 420 of the shelving unit 130 are provided with openings 411 and 421 in order to reduce an area where the measurement range of the LiDAR device 212 in the width direction is obstructed.

Figure 5:
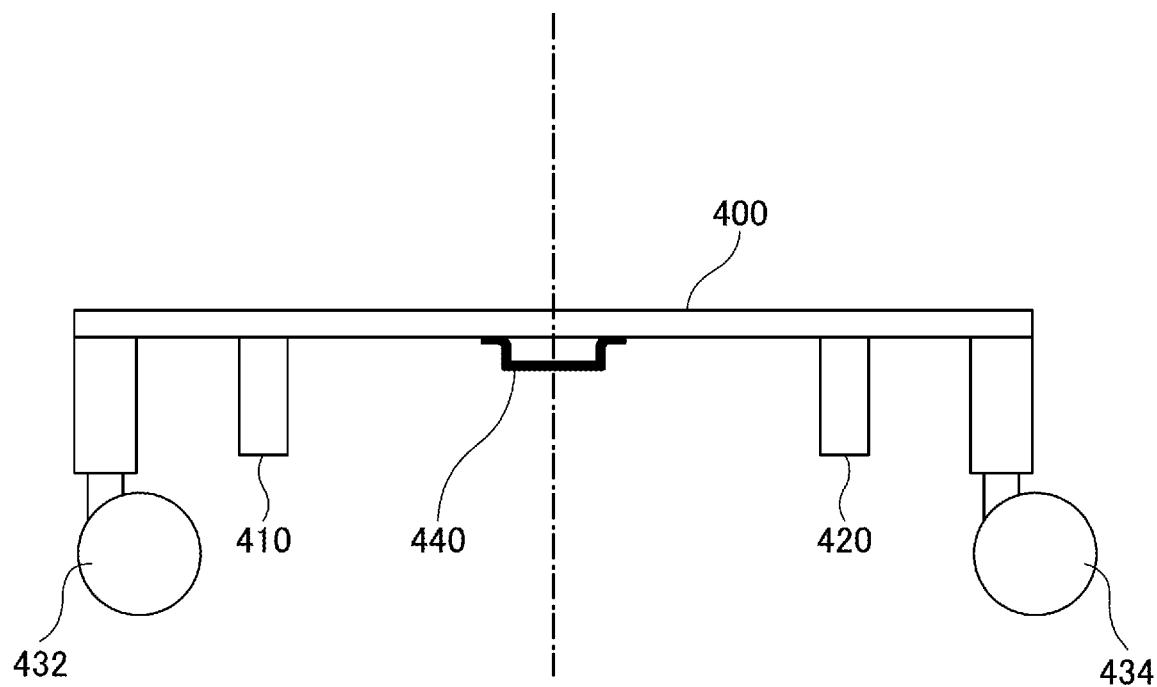
FIG. 5 is a front view illustrating an example of a schematic configuration below a bottom shelf of the shelving unit.

FIG. 5 is a front view illustrating a schematic configuration below the bottom shelf 400 of the shelving unit 130. As illustrated in FIG. 5, a projection 440 (an example of the coupling) is provided at the middle position between the pair of frame guides 410 and 420, i.e., the center position of the bottom shelf 400 of the shelving unit 130 in the x direction, so as to project downward from the lower surface of the bottom shelf 400. In the present embodiment, the projection 440 has, for example, a columnar shape, but is not limited to this shape.

The above-described locking device 211 of the autonomous vehicle 120 is configured to be movable upward and downward. The locking device 211 is raised and mated with the projection 440, thereby coupling the autonomous vehicle 120 and the shelving unit 130 to each other. That is, the locking device 211 (the docking mechanism) of the autonomous vehicle 120 and the projection 440 (the coupling) of the shelving unit 130 (the conveyance target) form a "coupling structure between the autonomous vehicle and the conveyance target" according to the present embodiment.

<Relationship Between Positions of Casters of Shelving Unit and Position of Docking Mechanism of Autonomous Vehicle>

Figure 6:
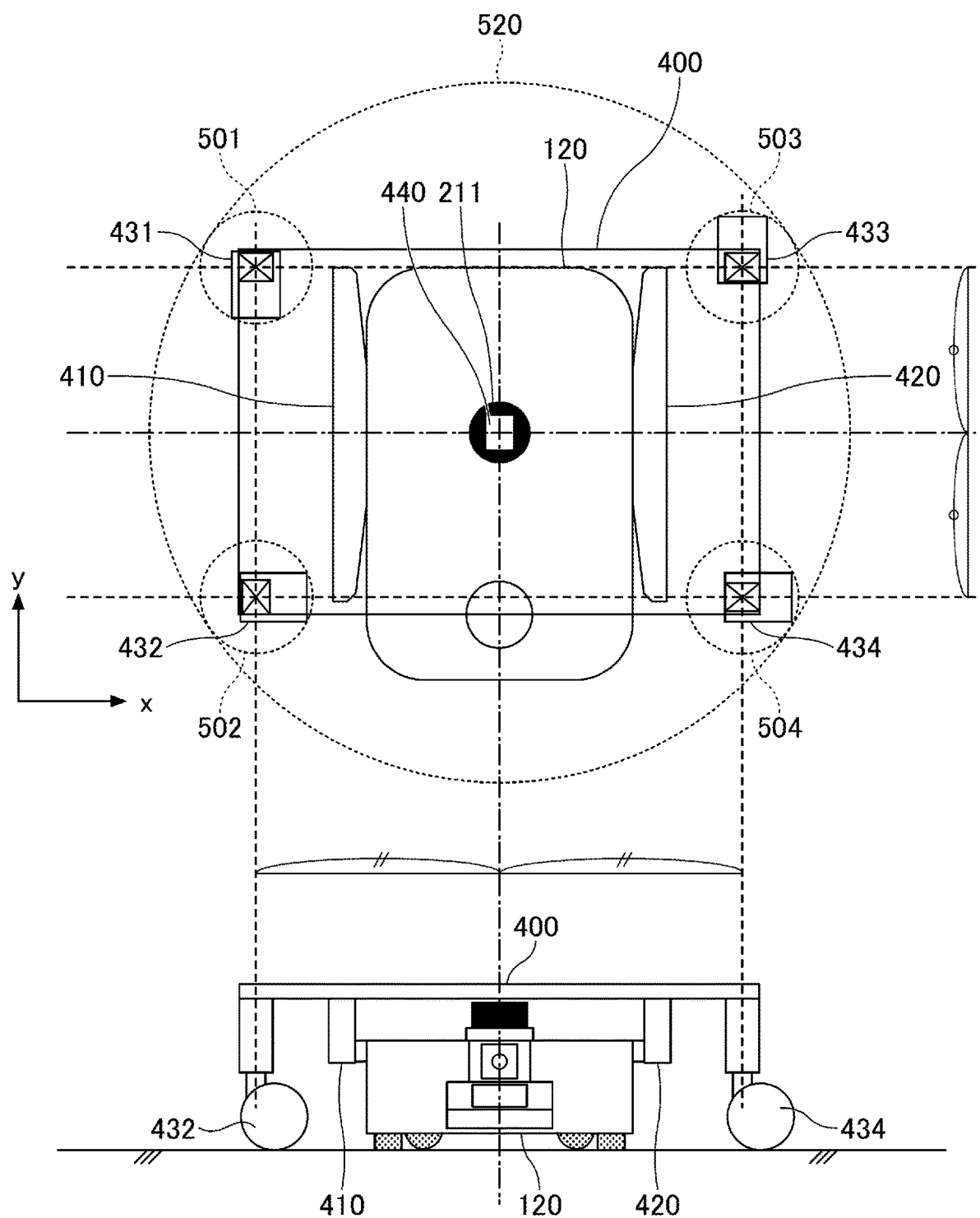
FIG. 6 is a view illustrating a positional relationship between casters of the shelving unit and a docking mechanism of the autonomous vehicle.

The positional relationship between the casters 431 to 434 that are rotatably attached to the shelving unit 130 and the docking mechanism of the autonomous vehicle 120 will be described next. FIG. 6 is a view illustrating the positional relationship between the casters of the shelving unit and the docking mechanism of the autonomous vehicle.

The upper part of FIG. 6 is a state in which the autonomous vehicle 120 is docked with the shelving unit 130 as viewed from directly above the bottom shelf 400 of the shelving unit 130. Note that, however, only the outer frame of the bottom shelf 400 is illustrated for the sake of descriptive convenience. Further, the lower part of FIG. 6 is a state in which the autonomous vehicle 120 is docked with the shelving unit 130 as viewed in the direction of the front surface 220 of the autonomous vehicle 120.

As illustrated in the upper part of FIG. 6, the four casters 431 to 434 of the shelving unit 130 are rotatably attached at the corners of the bottom shelf 400. Reference numerals 501 to 504 indicate the rotation ranges of the four wheels 431 to 434, respectively. The respective center positions of the rotation ranges 501 to 504 are the respective centers of rotation of the casters 431 to 434.

As illustrated in the upper part of FIG. 6, the projection 440 is provided on the underside of the bottom shelf 400 of the shelving unit 130. The projection 440 is engaged with the recess of the locking device 211 that is moved upward.

Engagement of the locking device 211, having a recessed shape, with the projection 440, having a projecting shape, can prevent the shelving unit 130 from shifting in the forward direction or the backward direction relative to the autonomous vehicle 120 when the autonomous vehicle 120 is to convey the shelving unit 130. Note that in the drawing of the present embodiment, the locking device 211 in a state of being moved upward is indicated in black in order to clearly illustrate whether or not the locking device 211 is in a state of being moved upward.

The center position of the projection 440 is provided to match the center position with respect to each of the respective centers of rotation of the four casters 431 to 434 of the shelving unit 130 (see the broken lines and the chain lines in FIG. 6). Therefore, in a state in which the autonomous vehicle 120 is docked with the shelving unit 130, the center position of the locking device 211 can also be the center position with respect to the respective centers of rotation of the four casters 431 to 434 of the shelving unit 130.

As described above, because the autonomous vehicle 120 is provided to rotate about the locking device 211 as the center, the shelving unit 130 may turn about the center position with respect to the respective centers of rotation of the four wheels 431 to 434 when the autonomous vehicle 120 turns. That is, the rotation range of the shelving unit 130 when the autonomous vehicle 120 turns can be the range indicated by reference numeral 520.

<Operation Example of Docking Mechanism>

Figure 7B:
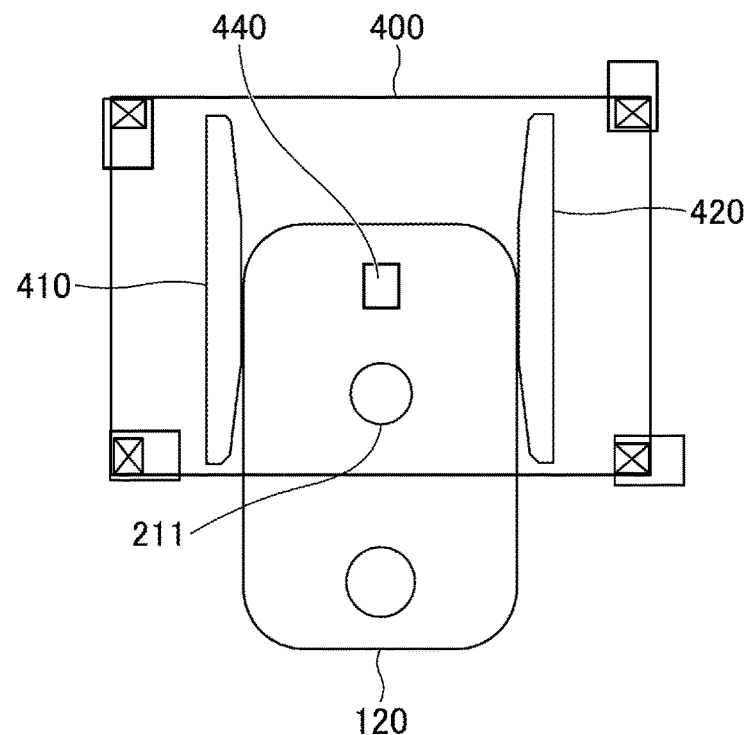
Figure 7C:
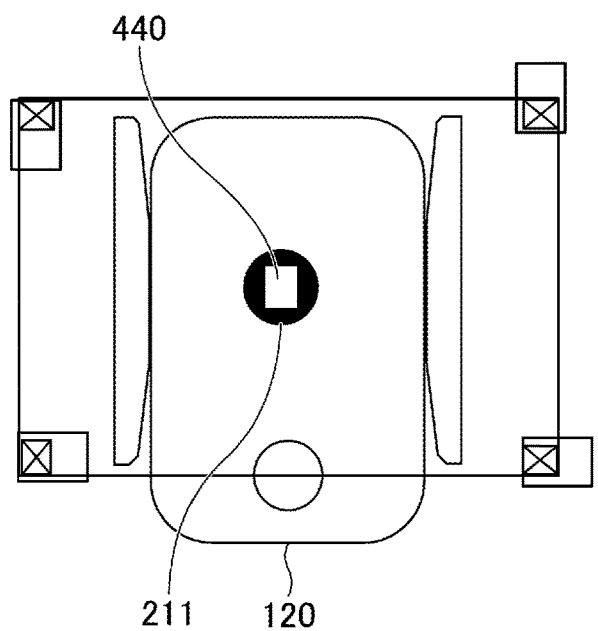

An operation example of the docking mechanism when the autonomous vehicle 120 is to dock with the shelving unit 130 will be described. Here, an operation example when the autonomous vehicle 120 is to dock with the shelving unit 130 that is standing by in the position of the anchor 170 will be described. FIGS. 7A to 7C are views illustrating the examples of the operation of the docking mechanism upon docking. In a similar manner to the upper part of FIG. 6, FIGS. 7A to 7C each illustrate a state as viewed from directly above the bottom shelf 400 of the shelving unit 130. Note that, however, only the outer frame of the bottom shelf 400 is illustrated for the sake of descriptive convenience.

FIG. 7A illustrates a state in which the autonomous vehicle 120 has moved to a position near the conveyance-target shelving unit 130 and has subsequently searched for the shelving unit 130 based on a color image captured by the front RGB camera 221. In the present embodiment, the shelving unit 130 is searched for by extracting, from the color image, a marking that is provided to the shelving unit 130 in advance to identify the shelving unit 130. Alternatively, the shelving unit 130 may be searched for based on the above in combination with the results by using a deep-learning-based object recognition model to perform instance segmentation or object recognition on the color image.

Furthermore, FIG. 7A illustrates a state in which the autonomous vehicle 120 has recognized the position and the orientation of the shelving unit 130 (the orientation of the frame guides 410 and 420) and has turned 180 degrees with respect to the entry direction at the time of docking when the autonomous vehicle 120 has found the shelving unit 130.

The autonomous vehicle 120 that has turned 180 degrees starts the docking operation based on the color image captured by the rear RGB camera 320.

Specifically, after the locking device 211 is moved downward by turning on the solenoid, the autonomous vehicle 120 starts moving in the backward direction and enters between the frame guide 410 and the frame guide 420 below the bottom shelf 400.

FIG. 7B illustrates a state in which the autonomous vehicle 120 has entered between the frame guide 410 and the frame guide 420 by moving in the backward direction. During the entry, the autonomous vehicle 120 determines whether or not the locking device 211 can be engaged with the projection 440. The determination as to whether or not the locking device 211 can be engaged with the projection 440 can be performed, for example, based on the measurement results of the photoreflector included in the locking device 211.

FIG. 7C illustrates a state in which the locking device 211 can be engaged with the projection 440. In the state as illustrated in FIG. 7C, the autonomous vehicle 120 turns off the solenoid to cause the locking device 211 to move upward and be engaged with the projection 440. As a result, the docking of the autonomous vehicle 120 with the shelving unit 130 is completed.

<Searching Method of Conveyance Target>

In the present embodiment, the autonomous vehicle 120 searches for the shelving unit 130 based on one or more markings provided to the shelving unit 130 in advance. The autonomous vehicle 120 recognizes the markings from one or more images including the one or more markings obtained by a sensor. The sensor in the present embodiment includes at least one of the front RGB camera 221, the ToF camera 222, the LiDAR device 212, or the rear RGB camera 320.

The marking in the present embodiment includes a code in which information is encoded and a mark (figure) that does not represent specific information. Examples of the code include one-dimensional codes, such as barcodes and the like, two-dimensional codes, such as QR codes (registered trademark), color codes (e.g., chameleon codes (registered trademark)), and the like, numerical or character sequences in which Arabic numerals, alphabets, or the like are arranged, and augmented reality (AR) markings, and the like. The code may be a given symbol recognizable from the image, and can be appropriately selected in accordance with a required quantity of information, recognition accuracy, and the like. The mark may be, for example, a figure that itself does not have a quantity of information, such as a reference mark. Each mark can be given a meaning in its position, color, shape, size, or the like.

The markings are disposed at predetermined positions of the shelving unit 130. The predetermined positions are, for example, positions at which the markings are capturable by the front RGB camera 221 or the rear RGB camera 320 in the entry direction in which the autonomous vehicle 120 docks with the shelving unit 130.

Figure 8:
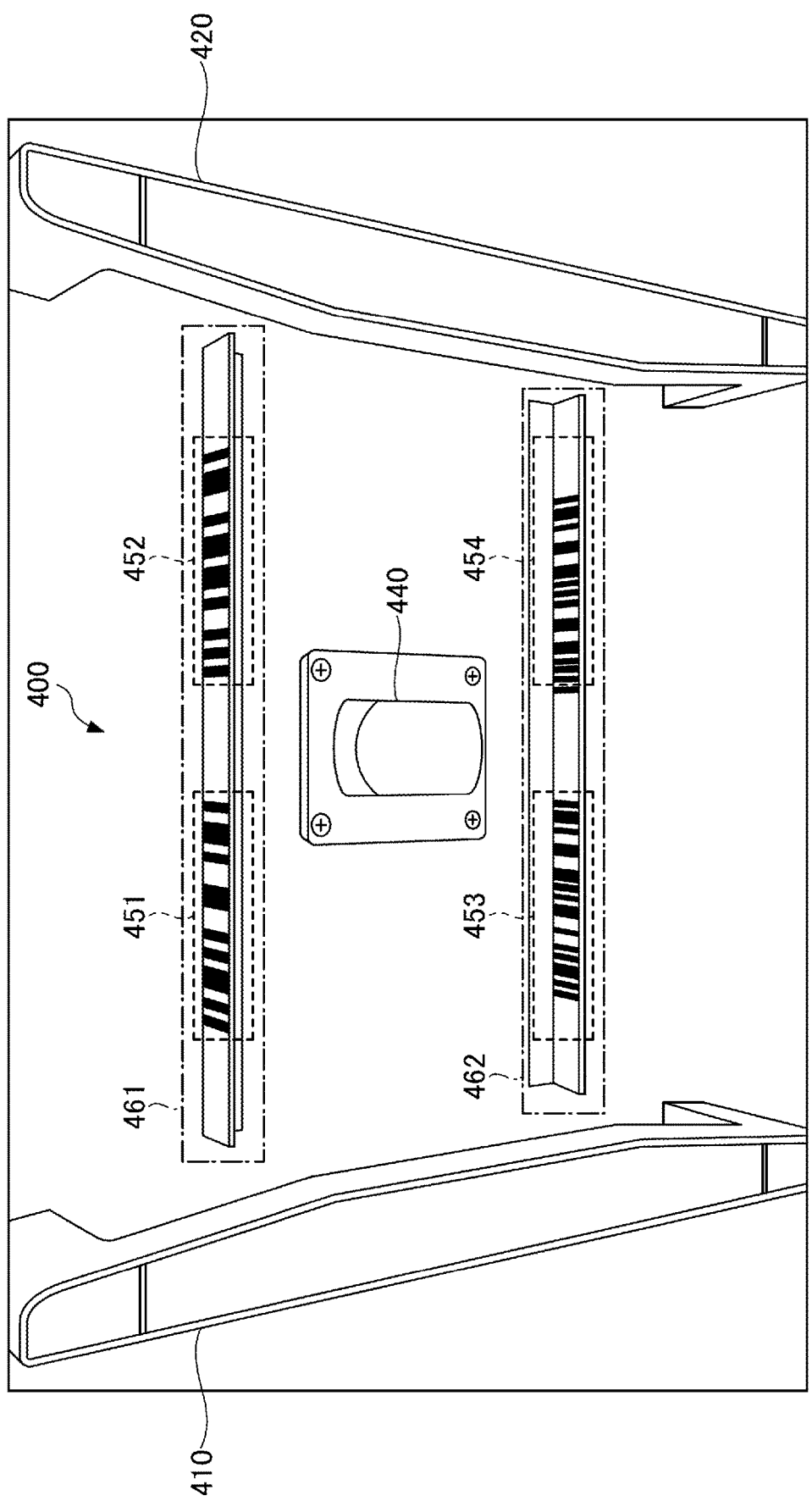
FIG. 8 is a view illustrating an example of a display position of a barcode.

FIG. 8 is a view illustrating an example of a display position of the marking. FIG. 8 illustrates the lower surface of the bottom shelf 400 of the shelving unit 130 as viewed from directly below. As illustrated in FIG. 8, the marking in the present embodiment includes four barcodes 451 to 454, and are disposed on the underside of the bottom shelf 400 of the shelving unit 130. Note that a direction of the upper side toward the lower side on the drawing in FIG. 8 corresponds to the entry direction of the autonomous vehicle 120.

Of the barcodes 451 to 454, the barcodes 451 and 452, serving as a set, are displayed on a plate 461 vertically attached to the lower surface of the bottom shelf 400 of the shelving unit 130. Similarly, of the barcodes 451 to 454, barcodes 453 and 454, serving as another set, are displayed on a plate 462 vertically attached to the lower surface of the bottom shelf 400 of the shelving unit 130.

The barcodes 451 to 454 are formed on media, such as seals or the like (hereinafter may be referred to as "display media"), and the display media are attached to the plates 461 and 462 for display. The barcodes 451 to 454 may be formed on two display media set by set, or may be separately formed on four display media. That is, the markings may be individually formed on display media, or the markings may be formed on display media as sets. The display media may be anything, such as a paper sheet, a wood piece, a resin sheet, a resin panel, or the like, as long as the conveyance-target shelving unit 130 can have one or more markings. Also, depending on a type of the display media, the barcodes 453 and 454 (described below in detail) displayed on the rear surface of the plate 461 and the barcodes 451 and 452 (described below in detail) displayed on the rear surface of the plate 462 may be formed.

A material or an attachment method of the display media may be appropriately selected in accordance with the material, shape, surface status (roughness), and the like of the plate. For example, the barcode is printed on a paper sheet, a resin sheet, or the like, and the printed product is attached to the plate. In this state, the plate may be wrapped with a sheet having high light transmissivity, thereby attaching the printed product to the plate. Alternatively, the barcode may be directly printed on the surface of the plate. In this case, the plate itself functions as the display medium.

Further, the barcode may be formed by engraving the plate with laser beams.

Alternatively, a slit may be formed in the plate, and a medium provided with the barcode is formed may be inserted into the slit, thereby displaying the barcode. The barcode may be displayed by directly printing the barcode on the shelving unit 130 or by engraving the shelving unit 130 so as to have the barcode (e.g., on or in the bottom or side surface of the bottom shelf 400). A member in which the barcode is to be displayed may have a given shape, such as a cylindrical shape, a prismatic shape, or a spherical shape, in addition to the plate shape.

The plates 461 and 462 are disposed along the entry direction of the autonomous vehicle 120. The plates 461 and 462 are attached such that the surfaces thereof displaying the barcodes are oriented to the incoming side in the entry direction. The plate 461 and the plate 462 are disposed at symmetrical positions with the projection 440 interposed therebetween.

Thus, the barcodes 451 and 452 disposed frontward in the traveling direction (hereinafter may be referred to as "frontward barcodes 451 and 452") are arranged in a direction intersecting the entry direction. Similarly, the barcodes 453 and 454 disposed rearward in the traveling direction (hereinafter may be referred to as "rearward barcodes 453 and 454") are arranged in a direction intersecting the entry direction. Note that the direction intersecting the entry direction includes a direction orthogonal to the entry direction. The barcode 451 and the barcode 453 are arranged along the entry direction. Similarly, the barcode 452 and the barcode 454 are arranged along the entry direction.

The frontward barcodes 451 and 452 may be configured to express a smaller quantity of information than the rearward barcodes 453 and 454. In the example of FIG. 8, the frontward barcodes 451 and 452 each indicate 2-digit information, and the rearward barcodes 453 and 454 each indicate 4-digit information. Therefore, in the example of FIG. 8, the barcodes 451 to 454 can express 12-digit information. The quantity of information expressed by each barcode is an example and may be appropriately determined in consideration of a required quantity of information and a recognizable range.

When the barcodes 451 to 454 are displayed with the same area, the frontward barcodes 451 and 452 can be displayed at a lower resolution than in the rearward barcodes 453 and 454. This increases the recognition rate of the frontward barcodes 451 and 452, and the frontward barcodes 451 and 452 can be recognized from a farther location.

The rearward barcodes 453 and 454 may be a barcode that cannot be captured by the front RGB camera 221 or the rear RGB camera 320 unless the autonomous vehicle 120 approaches the shelving unit 130. In this case, the rearward barcodes 453 and 454 are recognized from a near location. Therefore, the rearward barcodes 453 and 454 can be increased in the resolution and the quantity of information.

The autonomous vehicle 120 can also enter below the bottom shelf 400 of the shelving unit 130 in a direction opposite to the entry direction. Therefore, the markings may be disposed so as to be captured in the same manner from both of the entry direction and the opposite direction. In the example of FIG. 8, the barcodes 451 and 452 may be displayed on the front surface of the plate 461, and the barcodes 453 and 454 may be displayed on the rear surface thereof. Similarly, the barcodes 453 and 454 may be displayed on the front surface of the plate 462, and the barcodes 451 and 452 may be displayed on the rear surface thereof.

Further, the markings may display information different between the frontward barcodes and the rearward barcodes. The autonomous vehicle 120 recognizes codes different between entry in the entry direction and entry in the opposite direction, and thus can recognize the entry direction.

Limitation may be imposed on the barcodes disposed leftward and rightward such that the barcode in a predetermined direction indicates a relatively great value. For example, the leftward barcode may be limited to indicate a greater value than does the rightward barcode, or the rightward barcode may be limited to indicate a greater value than does the leftward barcode. For example, when two or more shelving units are standing by side by side, the autonomous vehicle 120 may recognize two barcodes of different shelving units (that is, the autonomous vehicle 120 may recognize, as a set of barcodes, the rightward barcode of the leftward shelving unit and the leftward barcode of the rightward shelving unit). In this case, unless the above limitation is satisfied, the combination of codes may be discarded as an invalid combination. At this time, the distance between the two barcodes may be measured, and if the measured distance is not within a predetermined range, the combination of codes may be discarded as an invalid combination.

The limitation imposed on the two or more barcodes is not limited to the difference in the magnitude of values. For example, information to be included in a code disposed at a specific position may be limited to only a part of information that can be expressed by the code. A range of information to be included in a certain code may be determined by information to be included in another code to be disposed in combination.

The markings include identification information for identifying the shelving unit 130. The identification information may be, for example, a serial number that uniquely identifies the shelving unit 130. The identification information may be, for example, a stock keeping unit (SKU). In the example of FIG. 8, the two frontward barcodes 451 and 452 indicate the last four digits of the serial number, and the one rearward barcode 453 indicates the first four digits of the serial number.

The markings may include additional information on the shelving unit 130. The additional information may be, for example, a checksum of the identification information, information indicating the front and back of the shelving unit 130, attribute information of the shelving unit 130, a conveyance condition of the shelving unit 130, or the like. The attribute information may be, for example, the type of the shelving unit 130, the shape thereof, the outer dimensions thereof, the mass thereof, the number of shelves thereof (the number of shelves thereof), the position of the center of gravity thereof, the type of the casters, the shape thereof, the presence or absence of an electrical contact thereof, functions thereof (indicating functions that can be realized via an electrical contact, such as communication and power supply), an expiration date (provided in a rental contract, in which the number of days for approved use is limited), or the like. The conveyance condition may be, for example, a sensor invalid region, a usable sensor type, a conveyance speed, or the like. The conveyance condition may be determined, for example, based on the identification information. The additional information is not limited to the above, and given information can be set within a range allowable in terms of the quantity of information. In the example of FIG. 8, the barcode 454 indicates 4-digit additional information, and a checksum of the identification information is set as the additional information.

Figure 9:
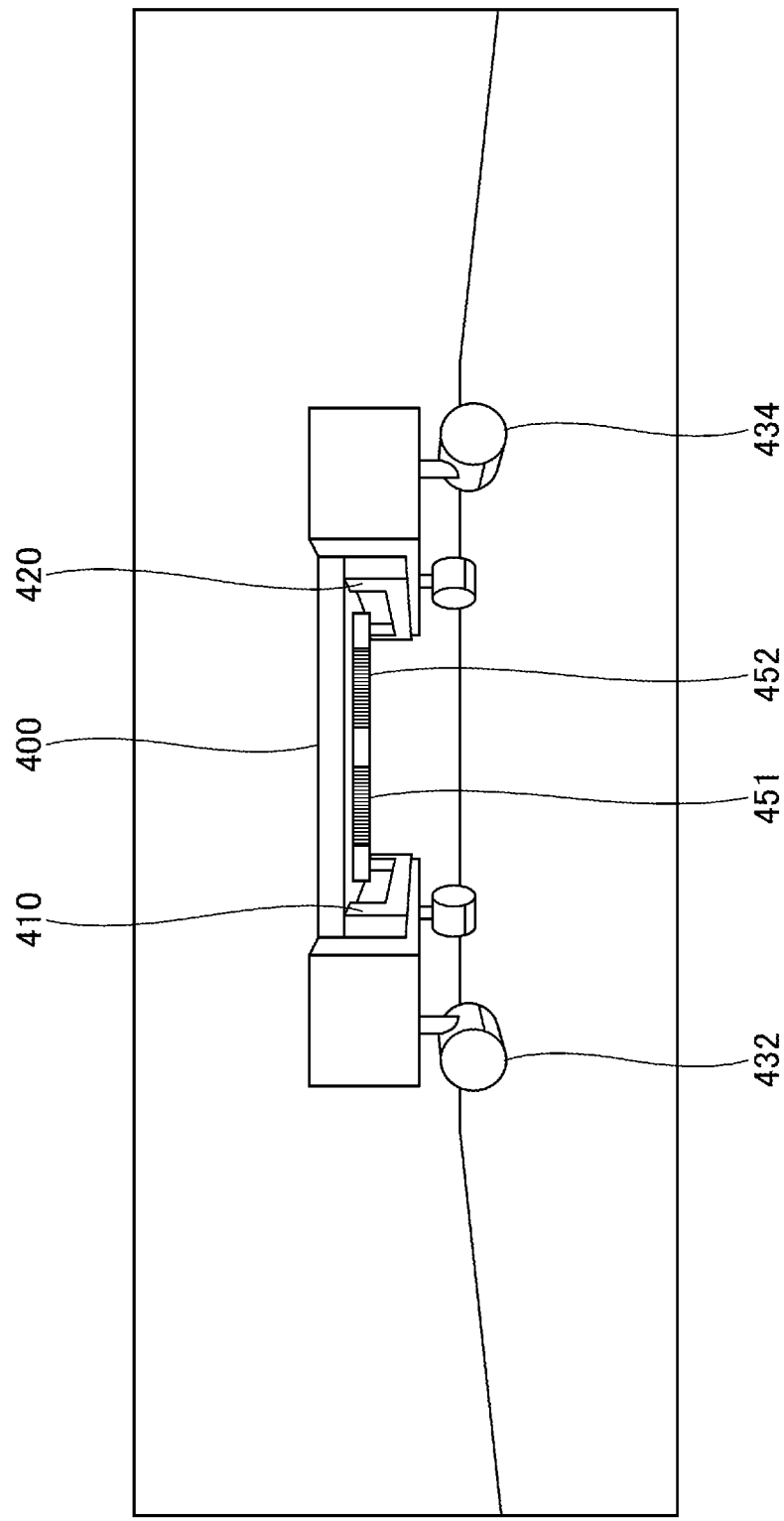
FIG. 9 is a view illustrating an example of an image captured by a camera upon docking.
Figure 10:
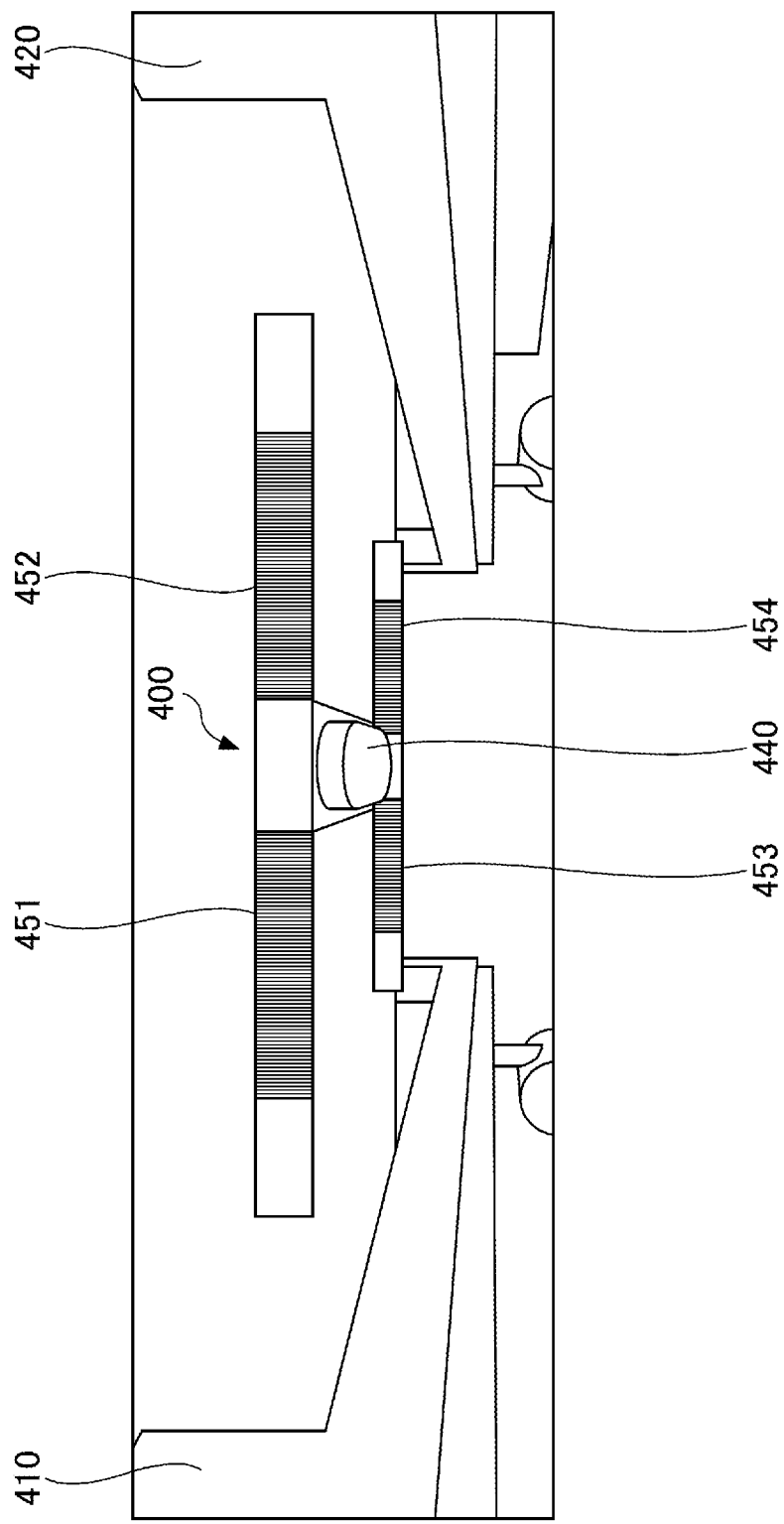
FIG. 10 is a view illustrating an example of an image captured by a camera upon docking.
Figure 11:
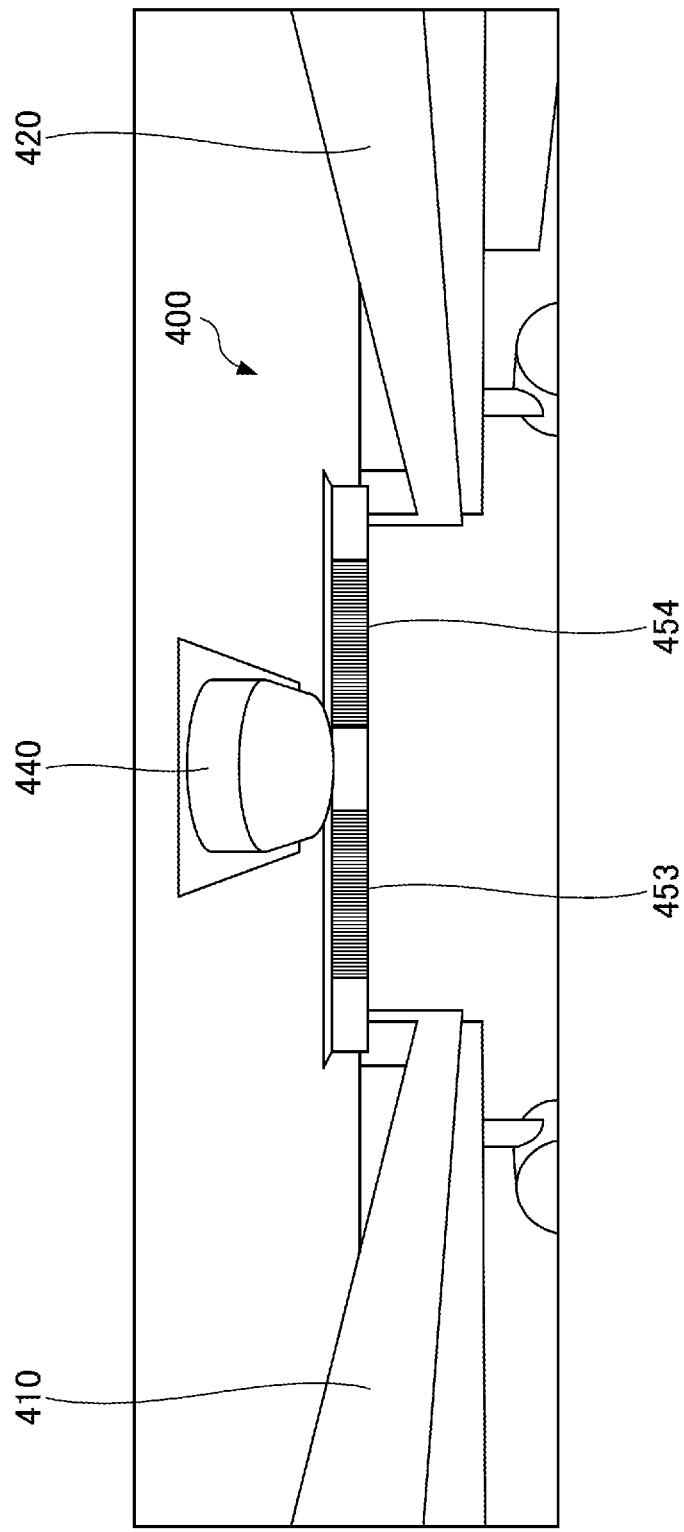
FIG. 11 is a view illustrating an example of an image captured by a camera upon docking.

The markings (barcodes 451 to 454) provided to the shelving unit 130 are differently seen from the front RGB camera 221 in accordance with the distance between the autonomous vehicle 120 and the shelving unit 130. FIG. 9 to FIG. 11 are diagrams each illustrating an example of an image captured by the front RGB camera 221 when the autonomous vehicle 120 is docked with the shelving unit 130.

FIG. 9 is an example of an image when the autonomous vehicle 120 reaches a position near the conveyance-target shelving unit 130 and starts searching. As illustrated in FIG. 9, when there is a distance between the autonomous vehicle 120 and the shelving unit 130, only the frontward barcodes 451 and 452 are captured by the front RGB camera 221. The autonomous vehicle 120 recognizes the last four digits of the serial number indicated by the barcodes 451 and 452 and identifies the shelving unit 130. If the shelving unit 130 can be identified by the last four digits of the serial number, the autonomous vehicle 120 starts entry below the bottom shelf 400 of the shelving unit 130. Note that the autonomous vehicle 120 may turn 180 degrees and enter in the backward direction, or may enter in the forward direction without turning. The case in which the shelving unit 130 can be identified indicates a case in which there are one or more shelving units 130 with matching last four digits in the serial numbers.

FIG. 10 is an example of an image when the autonomous vehicle 120 approaches the shelving unit 130 and enters below the bottom shelf 400. As illustrated in FIG. 10, when the autonomous vehicle 120 approaches the shelving unit 130, the rear RGB camera 320 captures the rearward barcodes 453 and 454 in addition to the frontward barcodes 451 and 452. The autonomous vehicle 120 recognizes the 8-digit serial number indicated by the barcodes 451 to 453 and identifies the shelving unit 130 again. When the shelving unit 130 can be identified, the autonomous vehicle 120 determines whether or not the serial number of the shelving unit matches the serial number of a shelving unit identified as the conveyance target. When the recognized serial number is different from the serial number of the conveyance-target shelving unit, the autonomous vehicle 120 stops docking. If the recognized serial number matches the serial number of the conveyance-target shelving unit, the autonomous vehicle 120 proceeds with entering below the bottom shelf 400 of the shelving unit 130.

FIG. 11 is an example of an image when the autonomous vehicle 120 enters below the bottom shelf 400 of the shelving unit 130. As illustrated in FIG. 11, when the autonomous vehicle 120 enters below the bottom shelf 400 of the shelving unit 130, the frontward barcodes 451 and 452 are out of the angle of view of the rear RGB camera 320, and only the rearward barcodes 453 and 454 are captured by the rear RGB camera 320. Thus, when the autonomous vehicle 120 recognizes the frontward barcodes 451 and 452, the autonomous vehicle 120 stores the last four digits of the serial number in a memory.

Subsequently, the autonomous vehicle 120 continues to enter below the bottom shelf 400 of the shelving unit 130 until completion of docking. Upon completion of docking, the autonomous vehicle 120 obtains a specification of the shelving unit 130 based on the serial number of the shelving unit 130. The specification of the shelving unit 130 includes, for example, at least one of the shape of the shelving unit 130 or the outer dimensions thereof. For example, information in which the serial number of the shelving unit 130 and the specification thereof are associated with each other may be stored in advance in the memory of the autonomous vehicle 120, and the specification of the shelving unit 130 may be obtained by reading out that information. Also, for example, information in which the serial number of the shelving unit 130 and the specification thereof are associated with each other may be stored in an external server, and the specification of the shelving unit 130 may be obtained from the external server based on the serial number of the shelving unit 130. Further, when the markings include additional information indicating the shape and outer dimensions of the shelving unit 130, the specification of the shelving unit 130 may be obtained from the recognition results of the barcodes. While conveying the shelving unit 130 to the position of the conveyance destination, the autonomous vehicle 120 avoids obstacles in consideration of the specification of the shelving unit 130.

<Functional Configuration of Controller>

Figure 12:
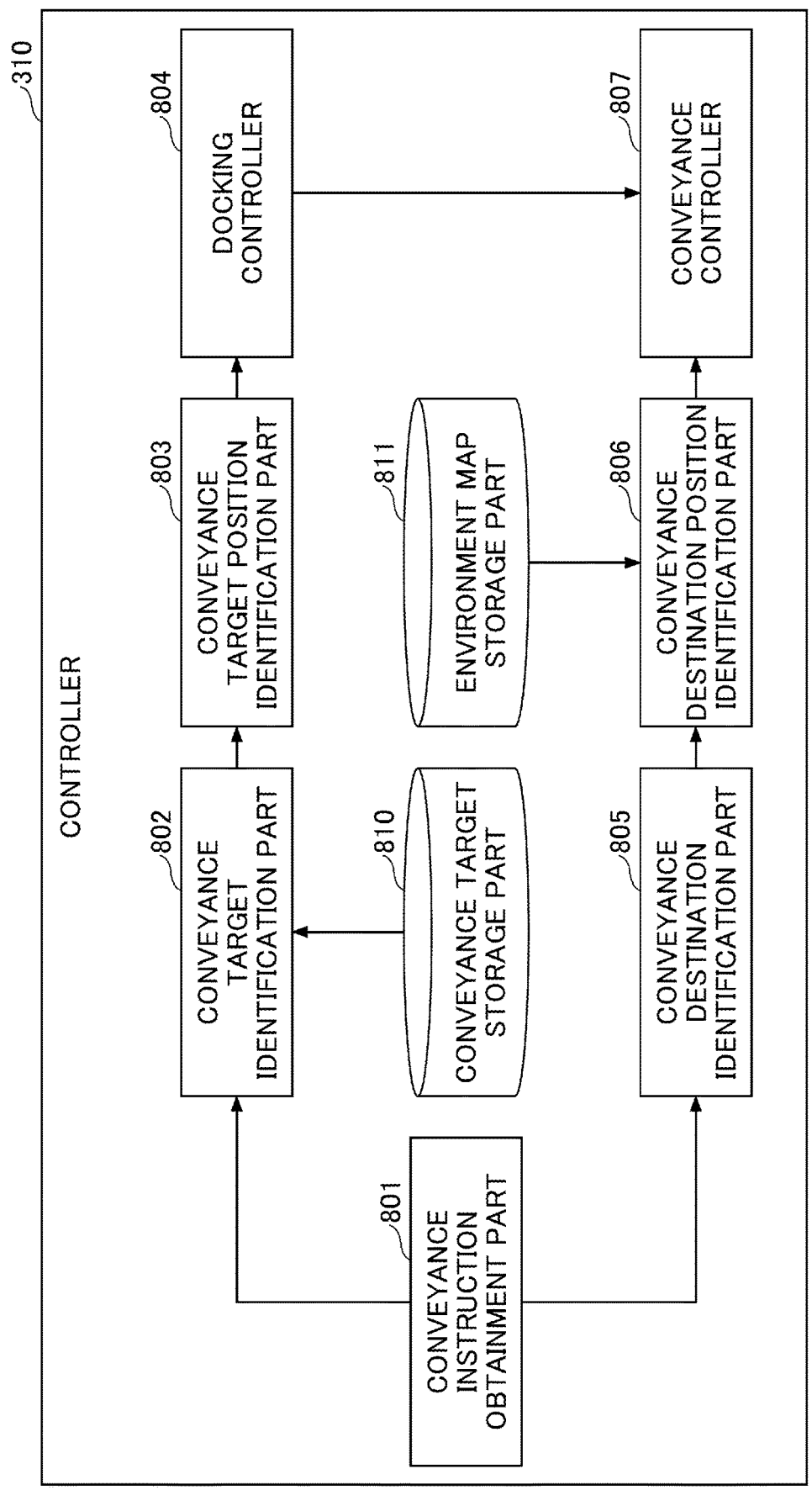
FIG. 12 is a block diagram illustrating an example of a functional configuration of a controller.

The functional configuration of the controller 310 will be described next. FIG. 12 is a diagram illustrating an example of the functional configuration of the controller. A control program is installed in the controller 310, and when the program is executed, the controller 310 functions as a conveyance instruction obtainment part 801, a conveyance target identification part 802, a conveyance target position identification part 803, a docking controller 804, a conveyance destination identification part 805, a conveyance destination position identification part 806, and a conveyance controller 807. The controller 310 also includes a conveyance target storage part 810 and an environment map storage part 811.

The conveyance instruction obtainment part 801 is configured to obtain the conveyance instruction given by the user 110. When the conveyance instruction obtainment part 801 is to obtain a voice instruction, the conveyance instruction obtainment part 801 recognizes a wake word uttered by the user 110 from the audio data detected by the microphones 301 to 304, and obtains a voice instruction following the wake word. When the conveyance instruction obtainment part 801 is to obtain an operation instruction, the conveyance instruction obtainment part 801 receives a control signal, indicating the conveyance instruction, from the information process terminal of the user 110. The conveyance instruction obtainment part 801 notifies the conveyance target identification part 802 and the conveyance destination identification part 805 of the obtained conveyance instruction.

The conveyance target identification part 802 is configured to analyze the conveyance instruction notified by the conveyance instruction obtainment part 801 and identify an item to be conveyed by the autonomous vehicle 120 (e.g., a laptop computer). The conveyance target identification part 802 refers to a conveyance target management table stored in the conveyance target storage part 810 and identify, as the conveyance target, a shelving unit on which the identified item is placed (e.g., the shelving unit 130). Moreover, the conveyance target identification part 802 notifies the conveyance target position identification part 803 of the identified conveyance-target shelving unit.

Note that when the obtained conveyance instruction includes a word indicating the conveyance-target shelving unit instead of the item to be conveyed, the conveyance target identification part 802 directly identifies the conveyance-target shelving unit (e.g., the shelving unit 130) and notifies the conveyance target position identification part 803 of the conveyance-target shelving unit.

The conveyance target position identification part 803 is configured to refer to the conveyance target management table stored in the conveyance target storage part 810 and identify the current position of the conveyance-target shelving unit notified by the conveyance target identification part 802. The conveyance target position identification part 803 also notifies the docking controller 804 of coordinates indicating the position of the identified conveyance-target shelving unit (e.g., coordinates indicating the position of the anchor 170).

The docking controller 804 is configured to move the autonomous vehicle 120 based on the coordinates indicating the position of the conveyance-target shelving unit, notified by the conveyance target position identification part 803, and based on the coordinates indicating the current position of the autonomous vehicle 120, thereby controlling the autonomous vehicle 120 to be docked with the conveyance-target shelving unit. Upon completion of docking of the autonomous vehicle 120 with the conveyance-target shelving unit, the docking controller 804 notifies the conveyance controller 807 of the completion of docking.

The conveyance destination identification part 805 is configured to analyze the conveyance instruction notified by the conveyance instruction obtainment part 801 and identify the position of the conveyance destination of the conveyance-target shelving unit (e.g., a position near the user 110). The conveyance destination identification part 805 also notifies the conveyance destination position identification part 806 of the identified position of the conveyance destination.

The conveyance destination position identification part 806 is configured to refer to an environment map stored in the environment map storage part 811 and identify the coordinates indicating the position of the conveyance destination when the position of the conveyance destination notified by the conveyance destination identification part 805 is a position near an object (e.g., a piece of furniture) disposed in the predetermined space 100. Note that the environment map registers the coordinates of the objects disposed in the predetermined space 100.

When the conveyance destination notified by the conveyance destination identification part 805 is a position near the user 110, the conveyance destination position identification part 806 identifies the coordinates indicating the position of the conveyance destination based on:

- the direction in which the user 110 is present, determined based on one of the microphones 301 to 304 from which audio data indicating the voice instruction has been detected; and
- the current position and orientation of the autonomous vehicle 120 when the voice instruction has been obtained.

Note that the autonomous vehicle 120 calculates its own position and orientation in the predetermined space 100 at predetermined cycles based on at least one of:

the measurement results obtained by the LiDAR device 212;

the color image captured by the front RGB camera 221; or the range image captured by the ToF camera 222.

Moreover, the conveyance destination position identification part 806 notifies the conveyance controller 807 of the coordinates indicating the identified position of the conveyance destination.

The conveyance controller 807 is configured to control the autonomous vehicle 120 to move based on the coordinates indicating the position of the conveyance destination notified by the conveyance destination position identification part 806 when the conveyance controller 807 is notified of the completion of docking by the docking controller 804.

During the movement of the autonomous vehicle 120, the conveyance controller 807 refers to the measurement results obtained by the LiDAR device 212, the color image captured by the front RGB camera 221, and the range image captured by the ToF camera 222. The conveyance controller 807 may cause the autonomous vehicle 120 to move in the backward direction by referring to the measurement results obtained by the LiDAR device 212 and the color image captured by the rear RGB camera 320. The conveyance controller 807 calculates the current position of the autonomous vehicle 120, and controls the autonomous vehicle 120 to avoid collision upon detecting an obstacle on a conveyance path.

After the autonomous vehicle 120 has reached the position of the conveyance destination, the conveyance controller 807 releases docking with the conveyance-target shelving unit and causes the autonomous vehicle 120 to move out from below the bottom shelf 400.

<Specific Example of Conveyance Target Management Table>

A specific example of the conveyance target management table stored in the conveyance target storage part 810 will be described next. FIG. 13 is a view illustrating an example of the conveyance target management table.

As illustrated in FIG. 13, a conveyance target management table 900 is a table in which conveyance-target shelving units are associated with respective items placed on the shelves. The conveyance target management table 900 includes "SHELVING UNIT INFORMATION", "ITEM", and "TAG" as examples of information items. However, "ITEM" and "TAG" are not essential and are not necessarily included in the conveyance target management table 900.

"SHELVING UNIT INFORMATION" further includes "ID", "TYPE", "DIMENSIONS", "INITIAL POSITION", "RELEASE POSITION", and "DOCKING POSITION". However, "DOCKING POSITION" is not essential and is not necessarily included in "SHELVING UNIT INFORMATION".

Identification information identifying each shelving unit is stored as "ID". Information identifying the type of each shelving unit is stored as "TYPE". Outer dimensions of each shelving unit are stored as "DIMENSIONS". In FIG. 13, "DIMENSIONS" is indicated in an orthogonal coordinate system, but a coordinate system may be changed in accordance with the shape of the shelving unit. For example, when the shelving unit has a columnar shape or an elliptical columnar shape, the outer dimensions thereof may be indicated in a cylindrical coordinate system. "INITIAL POSITION", "RELEASE POSITION", and "DOCKING POSITION" may include information indicating a posture (e.g., a yaw angle) in addition to the coordinates (x, y) indicating the position.

"SHELVING UNIT INFORMATION" may also include other information in relation to the shelving unit 130. Examples of the other information include the shape of the shelving unit 130, the mass thereof, the number of shelves thereof, the position of the center of gravity thereof, the type of the casters, the shape thereof, the presence or absence of an electrical contact thereof, functions thereof, and the like.

As "INITIAL POSITION", the coordinates indicating the position and posture of the shelving unit first recognized by the autonomous vehicle 120 during traveling in the predetermined space 100 are stored. Alternatively, as "INITIAL POSITION", the coordinates indicating the position and posture designated by the user 110 in advance (e.g., the position and posture of the anchor 170) are stored.

As "RELEASE POSITION", the coordinates indicating the position and posture at which the autonomous vehicle 120 released docking with the conveyance-target shelving unit last time are stored. As "DOCKING POSITION", the coordinates indicating the position and posture at which the autonomous vehicle 120 was docked with the conveyance-target shelving unit last time are stored. Note that the coordinates indicating each position are coordinates on the environment map. However, the name of a location preassigned on the environment map may be stored instead of the coordinates indicating each position.

As "ITEM", information indicating an item placed on the conveyance-target shelving unit is stored. As "TAG", information indicating the type of a corresponding item is stored.

In the case of the conveyance target management table 900 as illustrated in FIG. 13, "SHELVING UNIT INFORMATION", "ITEM", and "TAG" are directly associated with each other. However, they may be indirectly associated with each other. "Indirectly associated" refers to, for example, indirectly associating information A and information B via information C by directly associating the information A with the information C and directly associating the information C with the information B when the information A and the information B are to be associated.

The conveyance target management table 900 may be created in advance by the following method that is a non-limiting example. Specifically, when the user 110 has purchased a shelving unit, the user 110 may operate an application installed in the information process terminal and register information on the purchased shelving unit in "SHELVING UNIT INFORMATION". Alternatively, for example, when the autonomous vehicle 120 has found a new shelving unit during traveling in the predetermined space 100, the user 110 may register information on the found shelving unit in "SHELVING UNIT INFORMATION". Similarly, the user 110 may operate an application installed in the information process terminal and register information in relation to "ITEM" and "TAG" in the registered "SHELVING UNIT INFORMATION".

A predetermined conveyance destination may be set in the conveyance target management table 900. The predetermined conveyance destination may be set from shelving unit to shelving unit, or may be set from item to item. The predetermined conveyance destination may be registered by the user 110 who operates an application installed in the information process terminal.

<Functional Configuration of Docking Controller>

Figure 14:
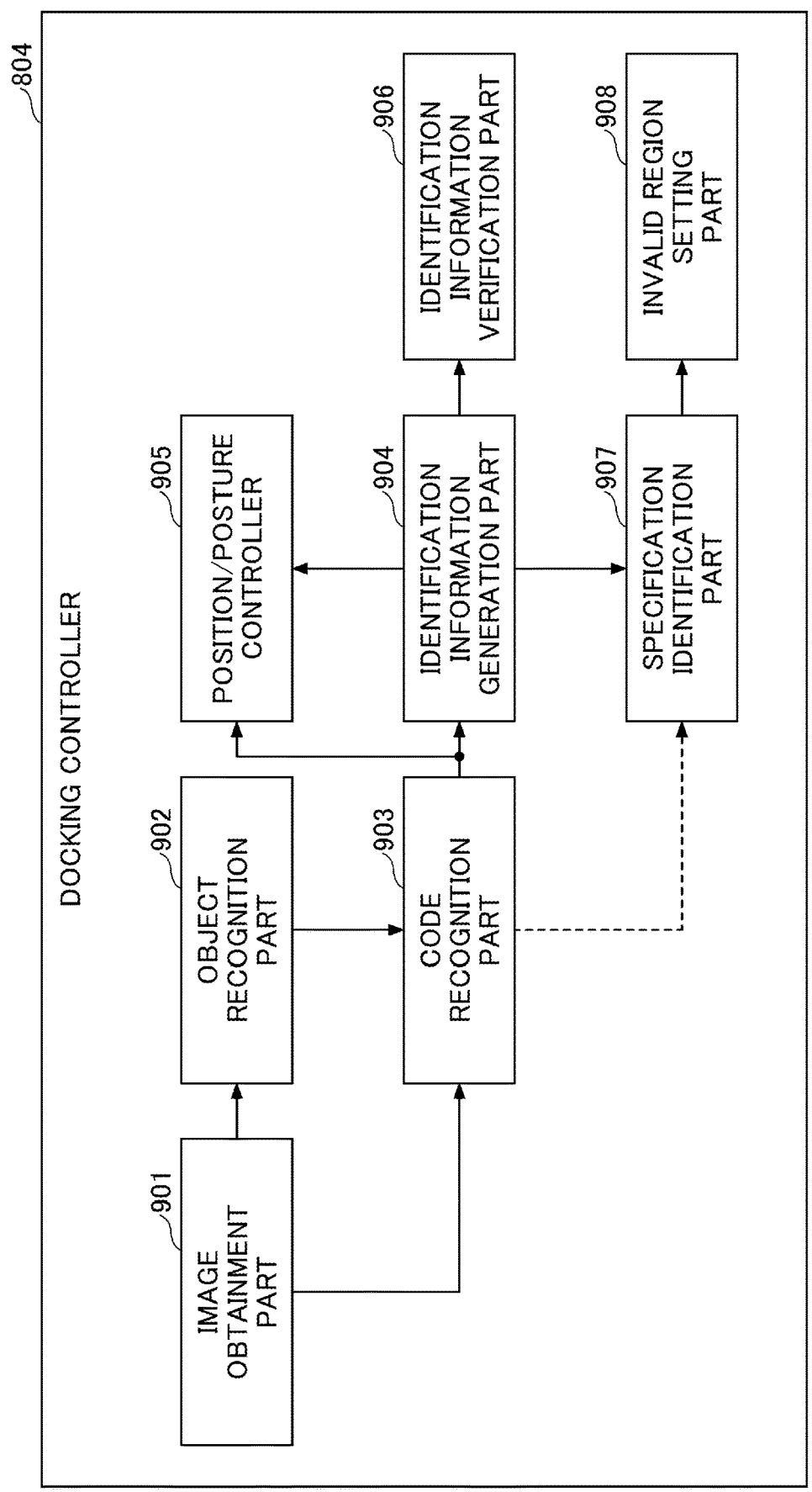
FIG. 14 is a block diagram illustrating an example of a functional configuration of a docking controller.

The functional configuration of the docking controller 804 will be described next in more detail. FIG. 14 is a diagram illustrating an example of the functional configuration of the docking controller.

As illustrated in FIG. 14, when the control program installed in the controller 310 is executed, the docking controller 804 functions as an image obtainment part 901, an object recognition part 902, a code recognition part 903, an identification information generation part 904, a position and posture controller 905, an identification information verification part 906, a specification identification part 907, and an invalid region setting part 908.

The image obtainment part 901 is configured to obtain a color image output by the front RGB camera 221 or the rear RGB camera 320. When the autonomous vehicle 120 is moving in the forward direction, the image obtainment part 901 obtains a color image output by the front RGB camera 221. When the autonomous vehicle 120 is moving in the backward direction, the image obtainment part 901 obtains a color image output by the rear RGB camera 320. The image obtainment part 901 notifies the object recognition part 902 and the code recognition part 903 of the obtained color image.

When the marking provided to the shelving unit 130 is recognizable based on a range image captured by the ToF camera 222, the image obtainment part 901 may obtain the range image captured by the ToF camera 222. For example, when the marking is a barcode, the marking can be recognized based on the range image (infrared image) output by the ToF camera 222. When the image obtainment part 901 has obtained the range image, the image obtainment part 901 notifies the code recognition part 903 of the obtained range image.

The object recognition part 902 is configured to recognize an object captured in the color image notified by the image obtainment part 901 based on a trained object recognition model (e.g., a trained neural network). Note that the object recognition model is trained to recognize a region corresponding to the shelving unit from an input image. The training data for the object recognition model is data obtained by providing captured color images of conveyance-target shelving units with labels indicating regions corresponding to shelving units. When the object recognition part 902 recognizes the shelving unit 130 from the color image, the object recognition part 902 notifies the code recognition part 903 and the position and posture controller 905 of recognition results indicating a region corresponding to the shelving unit 130.

The object recognition part 902 may recognize an object based on the range image captured by the ToF camera 222. The object recognition part 902 may recognize an object based on a grayscale image output by a camera different from the front RGB camera 221 and the rear RGB camera 320. Also, a stereo camera may be used for recognizing an object.

The code recognition part 903 is configured to extract an image of a recognition target range of the marking, from the color image or the range image notified by the image obtainment part 901. Before extracting an image, the code recognition part 903 may control the position and posture of the autonomous vehicle 120 such that the marking is readily recognized. The position and posture at which the marking is readily recognized is, for example, a position and posture at which the shelving unit 130 is capturable from the front. When the code recognition part 903 is notified of the recognition results from the object recognition part 902, the code recognition part 903 extracts an image of the recognition target range of the marking, from the region corresponding to the shelving unit indicated in the recognition results.

The recognition target range of the marking is a range in which the marking provided to the shelving unit 130 can be included. The recognition target range of the marking may be set in advance in accordance with the type of the shelving unit 130. In the present embodiment, because the shelving unit 130 includes the marking on the underside of the bottom shelf 400, an image may be extracted in a range of from the floor 240 to the height of the bottom shelf 400.

When the marking is a barcode, the code recognition part 903 binarizes the extracted image through thresholding or the like, and converts the image into a monochrome image. At this time, the code recognition part 903 may correct the image based on the internal parameters and the like of the camera before the binarization. This can remove, for example, lens distortion and the like.

The code recognition part 903 recognizes the barcode from the monochrome image. When the code recognition part 903 recognizes the barcode, the code recognition part 903 notifies the identification information generation part 904 and the position and posture controller 905 of the recognition results indicating the position and value of the barcode. Note that when the markings include additional information indicating the outer dimensions and the like of the shelving part 130, the code recognition part 903 notifies the specification identification part 907 of the recognition results of the barcode.

When the marking is a numerical or character sequence, the code recognition part 903 recognizes the numerical or character sequence from the extracted image. The recognition of the numerical or character sequence can be performed, for example, through optical character recognition (OCR) or the like. When the code recognition part 903 recognizes the numerical or character sequence, the code recognition part 903 notifies the identification information generation part 904 and the position and posture controller 905 of the recognition results indicating the position and value of the numerical or character sequence.

When the marking is a figure, the code recognition part 903 recognizes the figure from the extracted image. The recognition of the figure can be performed based on, for example, a trained object recognition model (e.g., a trained neural network). When the code recognition part 903 recognizes the figure, the code recognition part 903 obtains a predetermined value based on information on the figure. Examples of the information on the figure include the position, color, shape, size, and the like of the figure. The code recognition part 903 notifies the identification information generation part 904 and the position and posture controller 905 of the recognition results indicating the position of the figure and the obtained value.

Note that the code recognition part 903 may obtain the value from, for example, information associating the figure-related information with the value. The information associating the figure-related information with the value may be stored in advance in the memory of the autonomous vehicle 120. Further, the information associating the figure-related information with the value may be stored in an external server, and the value may be obtained from the external server based on the recognition results of the figure.

The code recognition part 903 may recognize the two or more markings based on one image. The code recognition part 903 may recognize the two or more markings based on the two or more images captured at different angles of view. Therefore, the recognition results obtained by the code recognition part 903 may be: the recognition results of one or more markings recognized from the same image; or the recognition results of one or more markings that include one or more markings recognized from one image and one or more markings recognized from another image.

Further, when limitation is imposed on the sequence of the barcode, the code recognition part 903 determines whether or not the recognized barcode satisfies the limitation. For example, when limitation is imposed on two barcodes disposed leftward and rightward such that the leftward barcode indicates a greater value than the rightward barcode, the code recognition part 903 determines whether or not the values of the two recognized barcodes satisfy the limitation. Also, for example, when limitation is imposed on the distance between the two barcodes, the code recognition part 903 determines whether or not the distance is within a predetermined range (e.g., the distance between the leftward barcode and the rightward barcode is a 100 mm or the like) by measuring the distance between the two barcodes through triangulation or the like. If the limitation is not satisfied (i.e., if the rightward barcode indicates a greater value than the value of the leftward barcode, or if the distance between the two barcodes is not in the predetermined range), the code recognition part 903 discards the recognition results as false recognitions.

The identification information generation part 904 generates identification information based on the recognition results of the barcodes notified by the code recognition part 903. The identification information generation part 904 generates identification information according to different rules in accordance with the number of barcodes indicated in the recognition results and the number of digits of each value.

When the recognition results indicate two 2-digit barcodes, it can be considered that the frontward barcodes 451 and 452 have been recognized. This situation may occur when the autonomous vehicle 120 is located at a position that is away from the shelving part 130 by a distance equal to or more than a certain distance. In this case, the identification information generation part 904 combines the values of the two barcodes to generate the last four digits of the identification information. At this time, the identification information generation part 904 stores the last four digits of the identification information in the memory of the autonomous vehicle 120.

When the recognition results indicate four barcodes, it can be considered that all of the barcodes 451 to 454 have been recognized. This situation may occur when the autonomous vehicle 120 is located at a position that is in a distance shorter than a certain distance from the shelving unit 130. In this case, the identification information generation part 904 combines the values of three barcodes corresponding to the barcodes 451 to 453 to generate 8-digit identification information.

When the recognition results indicate two 4-digit barcodes, it can be considered that the rearward barcodes 453 and 454 have been recognized. This situation may occur when the autonomous vehicle 120 has already entered below the bottom shelf 400 of the shelving unit 130. In this case, the identification information generation part 904 combines the last four digits of the identification information stored in the memory of the autonomous vehicle 120 and the first four digits of the identification information corresponding to the barcode 453 to generate 8-digit identification information. At this time, the identification information generation part 904 notifies the identification information verification part 906 of the 8-digit identification information.

The identification information generation part 904 identifies the shelving unit including the recognized barcodes based on the generated identification information. Specifically, the identification information generation part 904 identifies the shelving unit by collating the generated identification information with the "ID" of the shelving unit information stored in the conveyance target management table 900. When the identification information generation part 904 generates the last four digits of the identification information, the identification information generation part 904 collates the last four digits with the last four digits of "ID". When the identification information generation part 904 generates 8-digit identification information, the identification information generation part 904 collates the 8-digit identification information with all of the digits of "ID".

In the present embodiment, because the identification information is eight digits, the shelving unit cannot be accurately identified even if the collation is performed only with the last four digits. However, in terms of a limited number of shelving units present in the predetermined space 100 in which the autonomous vehicle 120 can perform conveyance, the shelving unit can be identified even with only the last four digits in many cases. For example, when there are two conveyance-target shelving units in the predetermined space 100, the probability of overlapping of the last four digits between the shelving units is about 0.02%. For example, when there are ten conveyance-target shelving units in the predetermined space 100, the probability of overlapping of the last four digits between the shelving units is about 1.1%. Even if a shelving unit having different first four digits of identification information is identified, when the autonomous vehicle 120 approaches the shelving unit 130 for docking, all of the barcodes can be recognized and collation of the 8-digit identification information can be performed.

Further, when the shelving unit identified based on the identification information is the shelving unit identified as the conveyance target, the identification information generation part 904 notifies the position and posture controller 905 and the specification identification part 907 of the identification information. When the shelving unit cannot be identified based on the identification information or when the shelving unit identified based on the identification information is a shelving unit different from the shelving unit identified as the conveyance target, the identification information generation part 904 notifies the position and posture controller 905 of that result.

The position and posture controller 905 estimates relative position and posture between the autonomous vehicle 120 and the shelving unit 130 based on the recognition results of the barcodes notified by the code recognition part 903. When the recognition results indicate the positions of two barcodes, the position and posture controller 905 can calculate the distance between the autonomous vehicle 120 and the shelving unit 130 through triangulation using those positions.

When the recognition results of the barcodes indicate the position of one barcode, the position and posture controller 905 may calculate the distance between the autonomous vehicle 120 and the shelving unit 130 through triangulation using the left end and the right end of the barcode.

The position and posture controller 905 can calculate the deviation of the angle from the entry direction based on the positions of the two barcodes and the range image captured by the ToF camera 222.

Further, when the identification information is notified by the identification information generation part 904, the position and posture controller 905 performs entry below the bottom shelf 400 of the shelving unit 130 based on the relative position and posture between the autonomous vehicle 120 and the shelving unit 130. When the identification information generation part 904 notifies that the shelving unit cannot be identified, the position and posture controller 905 stops docking with the shelving unit identified as the conveyance target.

Subsequently, the position and posture controller 905 performs control to change the position or posture of the autonomous vehicle 120 in order to search for the conveyance-target shelving unit 130. Specifically, first, the position and posture controller 905 searches for another shelving unit present near the current position while changing the position or posture of the autonomous vehicle 120. If another shelving unit has been found, the position and posture controller 905 returns the process to the code recognition part 903, and recognizes the barcode of the found shelving unit. If the shelving unit can be identified with the last four digits of the identification information recognized from the found shelving unit, the autonomous vehicle 120 starts docking with that shelving unit.

The identification information verification part 906 verifies the validity of the identification information notified by the identification information generation part 904. The validity of the identification information may be verified based on:
- compliance with a numbering rule of identification information;
- the sequences of the barcodes satisfying a predetermined limitation;
- the distance between the barcodes being within a predetermined range;
- identification information being issued in an approved manner; or
- identification information indicating a shelving unit that the user is permitted to use.

Note that the identification information verification part 906 does not need to verify that the sequences of the barcodes satisfy the predetermined limitation or that the distance between the barcodes is within the predetermined range if the code recognition part 903 has already determined this condition.

The compliance with the numbering rule of the identification information is verified by calculating a checksum from the identification information. The checksum used for verification is set in, for example, additional information included in the marking provided to the shelving unit 130.

The fact that the identification information has been issued in an approved manner is verified based on shipping information managed by a manufacturer, a seller, a manager, or the like (hereinafter collectively referred to as a "manufacturer or the like") of the autonomous vehicle or the shelving unit. The shipping information may be stored in the memory of the autonomous vehicle 120 or may be stored in a management system installed in the manufacturer or the like.

The shipping information is managed, for example, as follows. First, the manufacturer or the like of the autonomous vehicle assigns a range of identification information for each stock keeping unit issued by the manufacturer or the like of the shelving unit. The manufacturer or the like of the shelving unit then assigns each of the manufactured shelving units with identification information within the range assigned to the stock keeping unit. The identification information and the stock keeping unit assigned to the shelving unit are managed in a database by the manufacturer or the like of the autonomous vehicle. The manufacturer or the like of the autonomous vehicle distributes the shipping information extracted from the database to the autonomous vehicle 120. The autonomous vehicle 120 may be configured to refer to the database via a network.

The shipping information includes identification information for identifying a conveyance-target shelving unit, information indicating whether or not the shelving unit has already been shipped, and the like. In accordance with a usage form (e.g., a subscription service, rental, lease, or the like) in which the user of the shelving unit, the period of use, or the like is limited, information indicating the user intended to use the shelving unit, information indicating the period of use of the shelving unit, or the like may be included.

When the shipping information is stored in the memory of the autonomous vehicle 120, the identification information verification part 906 collates the identification information notified by the identification information generation part 904 with the identification information stored in the shipping information. When the identification information matches the identification information of the shipped shelving unit, the identification information verification part 906 determines that the identification information is valid. When the identification information does not match any identification information or matches the identification information of an unshipped shelving unit, the identification information verification part 906 determines that the identification information is invalid.

When the shipping information includes information indicating the user or information indicating the expiration date of use, the identification information verification part 906 also verifies these pieces of information. For example, when the identification information is identification information of a shelving unit used by a user different from the user 110 or when the current date and time has passed the expiration date of use, the identification information verification part 906 determines that the identification information is invalid.

When the shipping information is stored in the management system of the manufacturer or the like, the identification information verification part 906 connects to the management system via a communication network, and transmits a verification request of the identification information notified by the identification information generation part 904, to the management system. The management system verifies the validity of the identification information by collating the received identification information with the shipping information.

When the identification information indicates an unshipped shelving unit, the docking controller 804 stops docking with the shelving unit identified as the conveyance target. Subsequently, the controller 310 outputs an utterance for notifying that the identification information is invalid, to the user 110 via the loudspeakers 305 and 306. For example, the controller 310 outputs an utterance saying "an invalid shelving unit has been found" to the user 110 via the loudspeakers 305 and 306. The controller 310 may also output a voice for notifying the reason why the identification information is invalid, such as "shipping information of the shelving unit cannot be confirmed", "the identified shelving unit is used by a different user", or "the expiration date of use of the shelving unit has passed", in accordance with the verification result of the identification information verification part 906.

The controller 310 may display a notification that the identification information is invalid, on the information process terminal of the user 110. For example, the controller 310 transmits a control signal for displaying a message, such as "an invalid shelving unit has been found" to the information process terminal of the user 110. Similarly, the controller 310 may transmit a control signal for displaying the reason why the identification information is invalid, to the information process terminal of the user 110.

The specification identification part 907 is configured to identify the specification of the shelving unit 130. The specification of the shelving unit 130 includes the shape and outer dimensions of the shelving unit 130. The shape of the shelving unit 130 includes, for example, the positions of the casters 431 to 434. The specification identification part 907 notifies the invalid region setting part 908 of the specification of the identified shelving unit 130.

For example, the specification identification part 907 identifies the shape and outer dimensions of the shelving unit 130 by reading out "TYPE" and "DIMENSIONS" stored in the conveyance target management table 900 based on the identification information notified by the identification information generation part 904. Note that the shape of the shelving unit 130 may be determined in advance in accordance with "TYPE" of the shelving unit 130.

For example, when the shape and outer dimensions of the shelving unit 130 are set in the additional information, the specification identification part 907 may identify the shape and outer dimensions of the shelving unit 130 by obtaining the shape and outer dimensions of the shelving unit 130 from the recognition results of the barcodes notified by the code recognition part 903.

The invalid region setting part 908 is configured to set a sensor invalid region in the measurement range of at least one of the LiDAR device 212, the front RGB camera 221, the rear RGB camera 320, or the ToF camera 222 based on the type and outer dimensions of the shelving unit 130 notified by the specification identification part 907. In a state in which the autonomous vehicle 120 is docked with the shelving unit 130, a part of the shelving unit 130 (e.g., the casters 431 to 434) may interfere with the measurement range of at least one of the LiDAR device 212, the front RGB camera 221, or the ToF camera 222. In this case, the autonomous vehicle 120 falsely recognizes that an obstacle is present very near the shelving unit 130, and cannot correctly determine a conveyance path. It is possible to avoid false recognition of an obstacle by invalidating the region of the measurement range with which a part of the shelving unit 130 may interfere, based on the type and outer dimensions of the shelving unit 130.

The sensor invalid region may be set in advance for each conveyance-target shelving unit. For example, the autonomous vehicle 120 stores, in the memory, information in which the identification information of the shelving unit and the sensor invalid region are associated with each other. The specification identification part 907 reads out information for setting the sensor invalid region from the memory based on the identification information notified by the identification information generation part 904. The sensor invalid region may be defined, for example, with setting information of the sensor, conditions in relation to a recognition operation of the sensor, and the like.

Further, for example, information in which the identification information of the shelving unit and the sensor invalid region are associated with each other may be stored in an external server, and the autonomous vehicle 120 may obtain the sensor invalid region of the shelving unit 130 from the external server based on the identification information notified by the identification information generation part 904.

The sensor invalid region may be set for each entry direction of each shelving unit. That is, for each shelving unit, a sensor invalid region upon entry from the front thereof and a sensor invalid region upon entry from the back thereof may be set.

Figure 15:
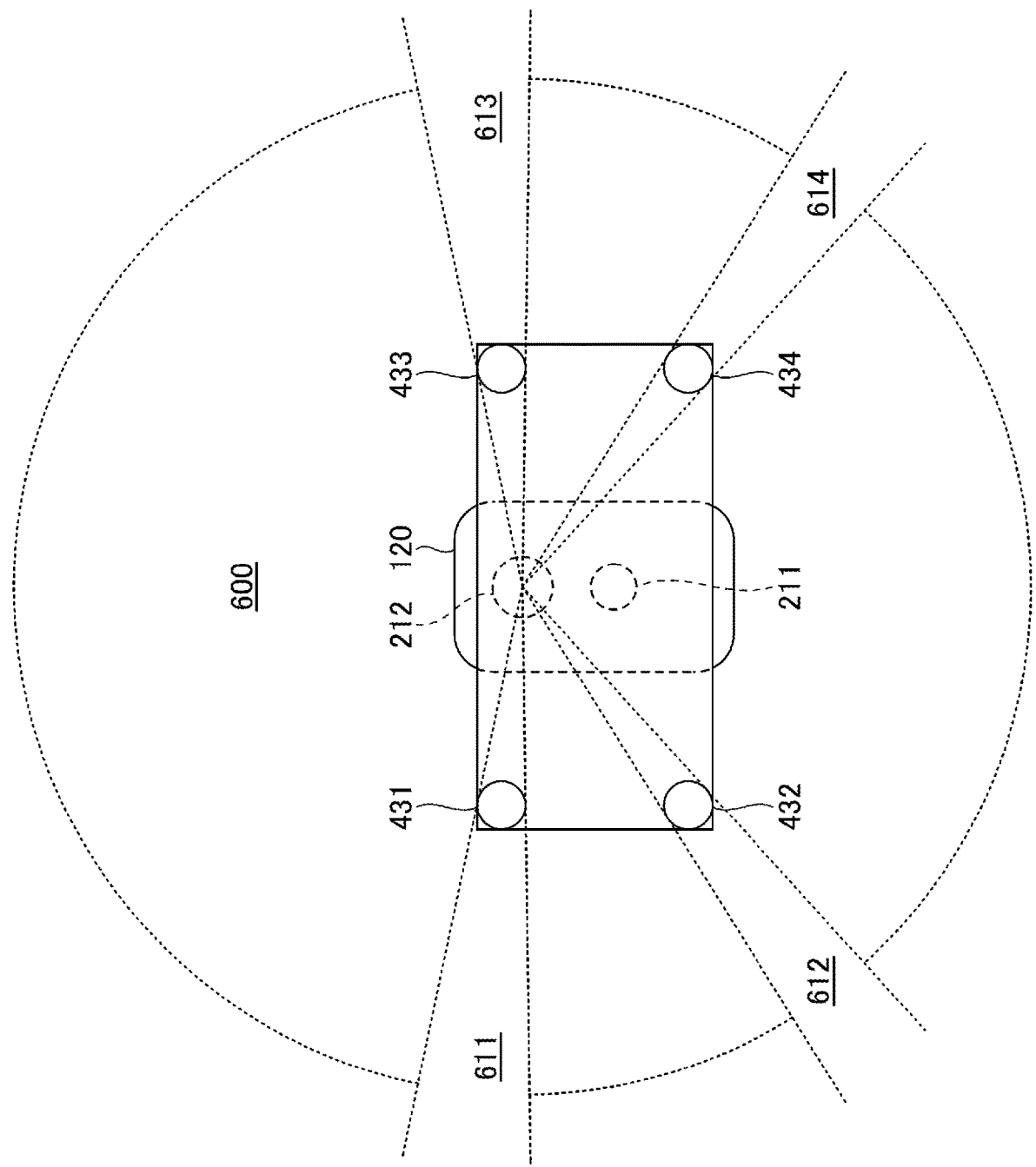
FIG. 15 is a view illustrating an example of a sensor invalid region of a laser imaging detection and ranging (LiDAR) device.

FIG. 15 is a view illustrating an example of the sensor invalid region set in the LiDAR device 212. As illustrated in FIG. 15, the LiDAR device 212 is disposed on the upper surface 210 of the autonomous vehicle 120, and has a measurement range 600 in the front-rear direction (y-axis direction) and the width direction (x-axis direction). The invalid region setting part 908 estimates the positions of the casters 431 to 434 based on the type of the shelving unit 130, and sets sensor invalid regions 611 to 614 corresponding to the casters 431 to 434, respectively, in directions in which the LiDAR device 212 can detect the casters 431 to 434.

Figure 16:
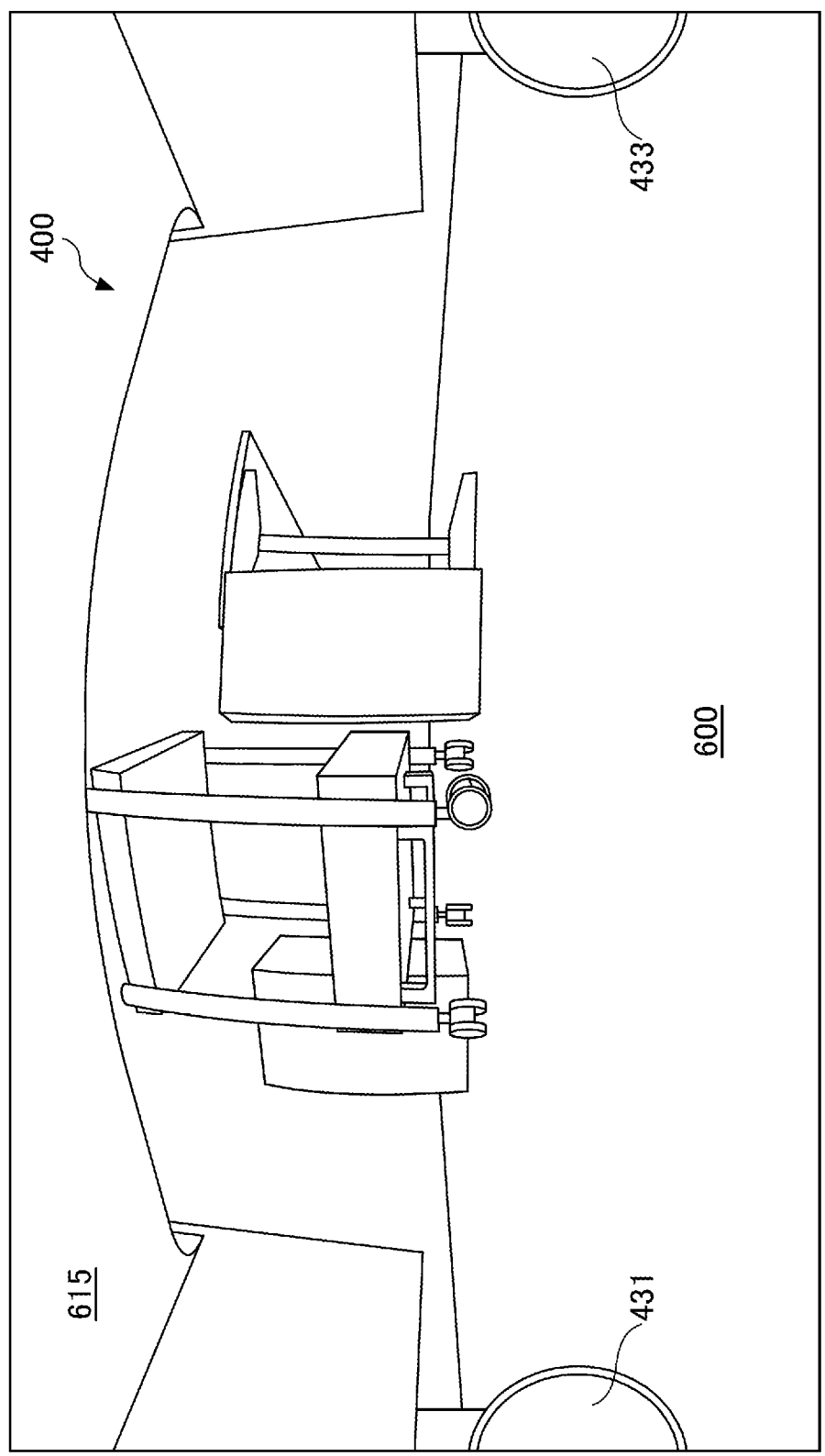
FIG. 16 is a view illustrating an example of a sensor invalid region of the camera.

FIG. 16 is a view illustrating an example of the sensor invalid region set for the front RGB camera 221 or the rear RGB camera 320. As illustrated in FIG. 16, in the front RGB camera 221 or the rear RGB camera 320, the angle of view of the camera is the measurement range 600. The invalid region setting part 908 estimates the positions of the shelf and the casters based on the type of the shelving unit 130, and sets the sensor invalid region 615 in a region including the shelf 400 and the casters 431 and 433.

Similarly, the sensor invalid region can be set in the measurement ranges of the ToF camera 222 and the microphones 301 to 304.

The front RGB camera 221 or the rear RGB camera 320, for which the sensor invalid region has been set, sets a pixel value of the sensor invalid region to an invalid value (e.g., zero) or to a pixel value therearound. The LiDAR device 212 or the ToF camera 222, for which the sensor invalid region has been set, sets the measurement result of the sensor invalid region to an invalid value. Further, in the case in which the sensor invalid region is set for the front RGB camera 221, the ToF camera 222, or the rear RGB camera 320, when the recognition result obtained by the object recognition part 902 is within the sensor invalid region, that recognition result may be rejected.

Note that the invalid region setting part 908 may set the sensor invalid region based on the recognition result obtained by the object recognition part 902 instead of the sensor invalid region corresponding to the type of the shelving unit 130 identified based on the identification information. For example, when the object recognition part 902 recognizes the casters 431 to 434 of the shelving unit 130 from the color image, the sensor invalid region may be set in the measurement range with which the casters 431 to 434 may interfere. The invalid region setting part 908 may set the sensor invalid region by combining the positions of the casters estimated from the identification information with the positions of the casters recognized from the color image.

<Flow of Autonomous Traveling Process>

Figure 17:
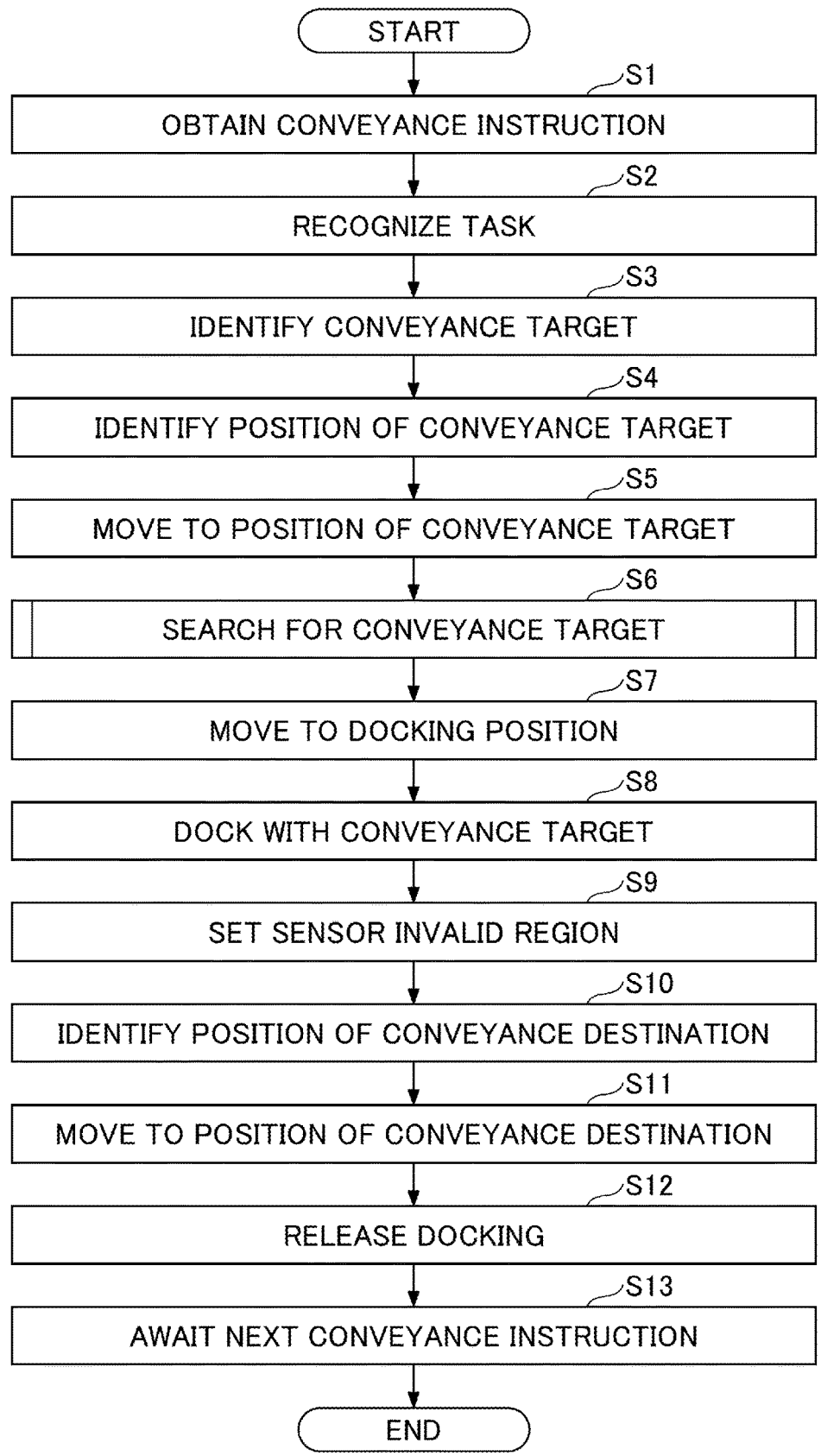
FIG. 17 is a flowchart illustrating an example of an autonomous traveling process.

A flow of an autonomous traveling process by the autonomous vehicle 120 will be described next. FIG. 17 is a flowchart illustrating an example of the autonomous traveling process.

In step S1, the conveyance instruction obtainment part 801 of the controller 310 obtains a conveyance instruction given by the user 110. The conveyance instruction obtainment part 801 may obtain a voice instruction or an operation instruction.

When the conveyance instruction obtainment part 801 obtains a voice instruction, the conveyance instruction obtainment part 801 recognizes a wake word uttered by the user 110 from the audio data detected by the microphones 301 to 304, and analyzes the audio data detected following the recognized wake word. Note that the wake word is set in advance in the autonomous vehicle 120, but the user 110 can change the wake word to a given word. Next, the conveyance instruction obtainment part 801 notifies the conveyance target identification part 802 and the conveyance destination identification part 805 of the voice instruction obtained as a result of analyzing the audio data.

When the conveyance instruction obtainment part 801 obtains an operation instruction, the conveyance instruction obtainment part 801 receives a control signal from the information process terminal of the user 110 and analyzes the control signal. Next, the conveyance instruction obtainment part 801 notifies the conveyance target identification part 802 and the conveyance destination identification part 805 of the operation instruction obtained as a result of analyzing the control signal.

In step S2, the conveyance target identification part 802 of the controller 310 recognizes an item or shelving unit to be conveyed, based on the conveyance instruction notified by the conveyance instruction identification part 801. The conveyance destination identification part 805 of the controller 310 recognizes the position of the conveyance destination based on the conveyance instruction notified by the conveyance instruction obtainment part 801. Thus, the controller 310 recognizes a task of conveying the item to the position of the conveyance destination.

For example, when the conveyance instruction obtainment part 801 obtains a voice instruction, such as "Bring me the laptop", the conveyance target identification part 802 recognizes a "laptop computer" as the item to be conveyed, and the conveyance destination identification part 805 recognizes a "position near the user 110" as the position of the conveyance destination. Thus, the controller 310 recognizes the recognized task as a task of conveying the "laptop computer" to the "position near the user 110".

When the conveyance destination is not designated by the conveyance instruction, the conveyance target identification part 802 may recognize a predetermined conveyance destination as the position of the conveyance destination. For example, the predetermined destination may be stored in advance in the memory of the autonomous vehicle 120. Further, for example, the predetermined destination may be registered in advance in the conveyance target management table 900 from shelving unit to shelving unit or from item to item.

At this time, the controller 310 may output a voice corresponding to the recognized task to the user 110 via the loudspeakers 305 and 306. For example, when the controller 310 recognizes a task of conveying a "laptop computer", which is the item to be conveyed, to a "position near the user 110", which is the position of the conveyance destination, the controller 310 outputs an utterance, such as "the laptop will be conveyed to the user" is output to the user 110 via the loudspeakers 305 and 306.

The controller 310 analyzes the audio data detected by the microphones 301 to 304 to determine a direction in which the user 110 has uttered the voice (in other words, a direction in which the user 110 is present).

The controller 310 stores, in the memory, the determination result of the direction in which the user 110 is present, together with information indicating coordinates of the position of the autonomous vehicle 120 and the direction of the autonomous vehicle 120 on an environment map (e.g., a map of the predetermined space 100) created in advance.

In step S3, the conveyance target identification part 802 of the controller 310 identifies a conveyance-target shelving unit based on the task recognized in step S2. Specifically, if the conveyance-target shelving unit is identified in the task, the conveyance target identification part 802 identifies the conveyance-target shelving unit. Otherwise, the conveyance target identification part 802 refers to the conveyance target management table 900 and identifies, as a conveyance target, a shelving unit associated with an item to be conveyed. In the present embodiment, because the laptop computer is managed in association with the shelving unit 130, the autonomous vehicle 120 identifies the shelving unit 130 as the conveyance target.

In step S4, the conveyance target position identification part 803 of the controller 310 identifies coordinates indicating the position of the conveyance-target shelving unit by referring to the conveyance target management table 900. For example, when the conveyance-target shelving unit is the shelving unit 130, coordinates (x2, y2, θ2) of the "RELEASE POSITION" are identified as the position of the shelving unit 130. This is because the coordinates (x2, y2, θ2) of the release position are the position at which the autonomous vehicle 120 released the docking with the shelving unit 130 last time, and thus the probability that the shelving unit 130 is present at that position is high.

Note that the conveyance target position identification part 803 may identify coordinates (x1, y1, θ1) of the "INITIAL POSITION" in the conveyance target management table 900 as the coordinates indicating the position of the conveyance-target shelving unit.

In step S4, the docking controller 804 of the controller 310 controls the drive wheels 231 to move the autonomous vehicle 120 to the position of the conveyance-target shelving unit 130. At this time, the docking controller 804 detects obstacles using the front RGB camera 221, the ToF camera 222, and the LiDAR device 212, and controls the autonomous vehicle 120 to move while avoiding collision with the detected obstacles.

At this time, the autonomous vehicle 120 is not docked with the shelving unit 130. Thus, the obstacle that would contact the shelving unit 130 if the shelving unit 130 were docked, is not recognized as an obstacle unless the obstacle contacts the autonomous vehicle 120.

In step S6, when the autonomous vehicle 120 reaches a position near the conveyance-target shelving unit 130, the conveyance target identification part 802 of the controller 310 analyzes the color image obtained from the front RGB camera 221 or the rear RGB camera 320 while moving the autonomous vehicle 120 and searches for the shelving unit 130. Here, the description will be continued assuming that the conveyance target identification part 802 has found the shelving unit 130 as a result of the search.

<<Conveyance Target Searching Process>>

Figure 18:
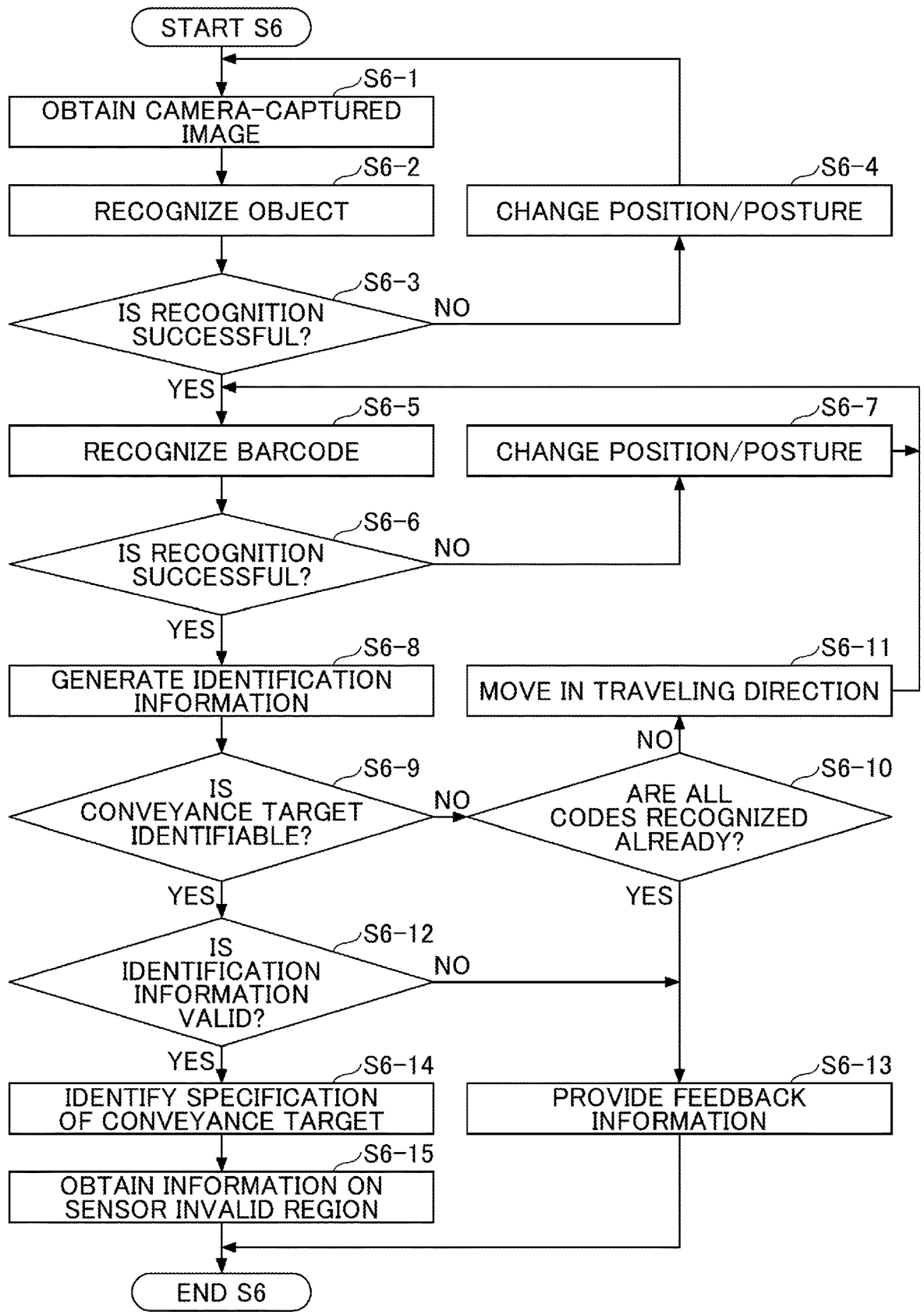
FIG. 18 is a flowchart illustrating an example of a conveyance target searching process.

The process (step S6 in FIG. 17) in which the autonomous vehicle 120 searches for the conveyance-target shelving unit 130 will be described in more detail. FIG. 18 is a flowchart illustrating an example of the conveyance target searching process.

In step S6-1, the image obtainment part 901 of the docking controller 804 obtains a color image output from the front RGB camera 221 or the rear RGB camera 320. The image obtainment part 901 transmits the obtained color image to the object recognition part 902 and the code recognition part 903.

In step S6-2, the object recognition part 902 of the docking controller 804 receives the color image from the image obtainment part 901. Next, the object recognition part 902 recognizes the object captured in the color image based on a trained object recognition model.

In step S6-3, the object recognition part 902 of the docking controller 804 determines whether or not the shelving unit 130 is recognized from the color image (in other words, whether or not the recognition result includes a region corresponding to the shelving unit 130). If the shelving unit 130 is recognized from the color image (YES), the object recognition part 902 transmits the recognition result of the shelving unit 130 to the code recognition part 903 and the position and posture controller 905, and causes the process to proceed to step S6-5. When the shelving unit 130 is not recognized from the color image (NO), the object recognition part 902 causes the process to proceed to step S6-4.

In step S6-4, the position and posture controller 905 of the docking controller 804 changes at least one of the position and the posture of the autonomous vehicle 120 such that a range captured by the front RGB camera 221 is changed. For example, the position and posture controller 905 controls the drive wheels 231 to move the autonomous vehicle 120 in the forward direction or in the backward direction. Further, for example, the position and posture controller 905 controls the drive wheels 231 to cause the autonomous vehicle 120 to make a turn.

In step S6-5, the code recognition part 903 of the docking controller 804 receives the color image from the image obtainment part 901. The code recognition part 903 receives the recognition result of the shelving unit 130 from the object recognition part 902. Next, the code recognition part 903 extracts an image of a recognition target range of the barcode from the color image. Subsequently, the code recognition part 903 binarizes the extracted image through thresholding or the like, and converts the image into a monochrome image. The code recognition part 903 recognizes the barcode from the monochrome image.

In step S6-6, the code recognition part 903 of the docking controller 804 determines whether or not the barcode is recognized from the monochrome image. If the barcode is recognized from the monochrome image (YES), the code recognition part 903 transmits the barcode recognition result to the identification information generation part 904 and the position and posture controller 905. When the barcode is not recognized from the monochrome image (NO), the code recognition part 903 causes the process to proceed to step S6-7.

In step S6-7, the position and posture controller 905 of the docking controller 804 receives the recognition result of the shelving unit 130 from the object recognition part 902. Next, the position and posture controller 905 controls the drive wheels 231 to move the autonomous vehicle 120 to a position and posture at which the barcode of the shelving unit 130 can be recognized.

Subsequently, the docking controller 804 executes steps S6-5 and S6-6 again at a new position. In this manner, the autonomous vehicle 120 repeatedly executes the movement of the position and the recognition of the barcode until the barcode is recognized.

When the position and posture controller 905 recognizes the barcode, the position and posture control part 102 adjusts the entry direction of the autonomous vehicle 120 based on the barcode recognition result. For example, when an angle has been found to be deviated from the entry direction into the shelving unit 130 based on the barcode recognition result, the position and posture controller 905 performs control to change the position and posture of the autonomous vehicle 120 so as to face the shelving unit 130 straight.

In step S6-8, the identification information generation part 904 of the docking controller 804 receives the barcode recognition result from the code recognition part 903. Next, the identification information generation part 904 generates identification information based on the barcode recognition result.

In step S6-9, the identification information generation part 904 of the docking controller 804 collates the identification information generated in step S6-8 with the identification information stored in the conveyance target management table 900. Next, the identification information generation part 904 determines whether or not the shelving unit 130 is uniquely identified. If the shelving unit 130 is uniquely identified (YES), the identification information generation part 904 transmits the identification information to the position and posture controller 905 and the specification identification part 907, and causes the process to proceed to step S6-11. Note that the case in which the shelving unit 130 is uniquely identified includes a case in which the 8-digit identification information matches one shelving unit 130. When the shelving unit 130 is not uniquely identified (NO), the identification information generation part 904 causes the process to proceed to step S6-10.

In step S6-10, the identification information generation part 904 of the docking controller 804 determines whether or not all of the barcodes have been recognized. In other words, the identification information generation part 904 determines whether or not all of the digits of the identification information have been recognized (in the present embodiment, whether or not the recognized identification information is eight digits). When all of the barcodes have been recognized (in the present embodiment, when the identification information is eight digits) (YES), the identification information generation part 904 causes the process to proceed to step S6-13. When not all of the barcodes have been recognized (in the present embodiment, when the identification information is four digits) (NO), the identification information generation part 904 causes the process to proceed to step S6-11.

In step S6-11, the position and posture controller 905 of the docking controller 804 controls the drive wheels 231 to move the autonomous vehicle 120 in the entry direction into the shelving unit 130. Subsequently, the docking controller 804 executes steps S6-5 to S6-10 again at a new position. In this manner, the autonomous vehicle 120 repeatedly enters the shelving unit 130 and identifies the shelving unit 130 until the shelving unit 130 is identified.

In step S6-9, although it is determined that the shelving unit 130 is uniquely identified when the 8-digit identification information matches one shelving unit 130, it may be determined that the shelving unit 130 is uniquely identified when the last four digits of the identification information match one shelving unit 130. In this case, before the execution of step S6-12, the autonomous vehicle 120 may be moved in the entry direction into the shelving unit 130, and the recognition process of the remaining codes may be executed.

In step S6-12, the identification information verification part 906 of the docking controller 804 receives the identification information from the identification information generation part 904. Next, the identification information verification part 906 verifies the validity of the identification information. When the identification information is valid (YES), the identification information verification part 906 causes the process to proceed to step S6-14. When the identification information is invalid (NO), the identification information verification part 906 causes the process to proceed to step S6-13.

In step S6-13, the controller 310 stops docking with the shelving unit identified as the conveyance target. Next, the controller 310 outputs an utterance for notifying that the docking with the shelving unit 130 has failed, to the user 110 via the loudspeakers 305 and 306. The controller 310 may transmit a control signal for displaying a message notifying that the docking has failed, to the information process terminal of the user 110.

In step S6-14, the specification identification part 907 of the docking controller 804 receives the barcode recognition result from the code recognition part 903. The specification identification part 907 receives identification information from the identification information generation part 904. Next, the specification identification part 907 identifies the specification of the shelving unit 130 based on the barcode recognition result or the identification information. The specification identification part 907 transmits the identified specification of the shelving unit 130 to the invalid region setting part 908.

In step S6-14, the invalid region setting part 908 of the docking controller 804 receives the specification of the shelving unit 130 from the specification identification part 907. Next, the invalid region setting part 908 obtains information on a sensor invalid region to be set in the measurement range of at least one of the LiDAR device 212, the front RGB camera 221, the ToF camera 222, or the rear RGB camera 320 based on the specification of the shelving unit 130.

The description will be made with reference to FIG. 17. In step S7, the docking controller 804 of the controller 310 causes the autonomous vehicle 120 to enter below the bottom shelf 400 of the shelving unit 130 that has been found. The autonomous vehicle 120 may enter in the forward direction or may enter in the backward direction after turning 180 degrees. Note that the docking controller 804 recognizes the space below the bottom shelf 400 of the shelving unit 130 using the rear RGB camera 320 even while the autonomous vehicle 120 is entering in the backward direction, and the docking controller 804 controls the movement of the autonomous vehicle 120 while adjusting the positional relationship with the bottom shelf 400.

In step S8, the docking controller 804 of the controller 310 determines that the locking device 211 has moved to a position at which the locking device 211 can be engaged with the projection 440.

When the autonomous vehicle 120 moves to a position at which the locking device 211 can be engaged with the projection 440, the docking controller 804 turns off the solenoid to move the locking device 211 upward and engage the locking device 211 with the projection 440. Thus, the autonomous vehicle 120 completes docking with the conveyance-target shelving unit 130.

When the docking is completed, the docking controller 804 updates the coordinates indicating "DOCKING POSITION", stored in the conveyance target management table 900, to the coordinates of the position at which the conveyance-target shelving unit 130 is actually docked.

For example, when docking with the conveyance-target shelving unit 130 is performed at the position of coordinates (x4, y4, θ4), the docking controller 804 updates the coordinates (x3, y3, θ3) to (x4, y4, θ4) regarding "DOCKING POSITION" of the shelving unit 130 in the conveyance target management table 900.

In step S9, the invalid region setting part 908 of the controller 310 sets the sensor invalid region in the measurement range of at least one of the LiDAR device 212, the front RGB camera 221, the ToF camera 222, or the rear RGB camera 320 based on the information on the sensor invalid region obtained in step S6-14.

In step S10, the conveyance destination position identification part 806 of the controller 310 identifies the coordinates of the position of the conveyance destination of the docked shelving unit 130 based on the task recognized in step S2. For example, in the case of a task of conveying a "laptop computer" to a "position near the user 110", the conveyance destination position identification part 806 identifies coordinates indicating a position near the user 110 as coordinates indicating the position of the conveyance destination of the docked shelving unit 130.

When the position near the user 110 is identified as the position of the conveyance destination, the conveyance destination position identification part 806 estimates the position at which the user 110 is highly likely to be present, based on the information stored in the memory in step S2. The conveyance destination position identification part 806 also identifies coordinates, on the environment map, indicating a position near the estimated position. The information stored in the memory in step S2 is the coordinates indicating the position of the autonomous vehicle 120 on the environment map, the information indicating the orientation of the autonomous vehicle 120, and the determination result of the direction in which the user 110 is present.

In step S11, the conveyance controller 807 of the controller 310 controls the drive wheels 231 to move the autonomous vehicle 120 to the position of the conveyance destination (a position near the user 110). At this time, the conveyance controller 807 detects obstacles using the front RGB camera 221, the ToF camera 222, and the LiDAR device 212, and controls the autonomous vehicle 120 to move while avoiding collision with the detected obstacles.

At this time, the autonomous vehicle 120 is already docked with the shelving unit 130. Thus, the autonomous vehicle 120 moves while avoiding not only the obstacles that contact the autonomous vehicle 120, but also the obstacles that do not contact the autonomous vehicle 120 but contact the shelving unit 130. At this time, the autonomous vehicle 120 determines whether or not there is a contact with another object in the width direction, the front-rear direction, and the height direction in consideration of the specification of the shelving unit 130 identified by the specification identification part 907. Thus, the autonomous vehicle 120 can determine a conveyance path while avoiding the obstacles with high accuracy.

In step S12, the docking controller 804 of the controller 310 releases the docking at the time of reaching the position of the conveyance destination (e.g., a position near the user 110). The docking controller 804 updates the coordinates indicating the "RELEASE POSITION", stored in the conveyance target management table 900, to the coordinates of the position at which the docking with the conveyance-target shelving unit 130 is actually released.

For example, when the docking with the conveyance-target shelving unit 130 is released at the position of coordinates (x5, y5, θ5), the docking controller 804 updates the coordinates (x2, y2, θ2) to (x5, y5, θ5) regarding "RELEASE POSITION" of the shelving unit 130 in the conveyance target management table 900.

Note that the docking controller 804 may search for the user 110 by analyzing a color image obtained from the front RGB camera 221 at the time of reaching the position of the conveyance destination. When the user 110 can be searched for, the docking controller 804 may release the docking.

In step S13, the conveyance controller 807 of the controller 310 confirms the presence or absence of a forward or backward obstacle using the front RGB camera 221, the ToF camera 222, and the LiDAR device 212. Then, the conveyance controller 807 causes the autonomous vehicle 120 to exit the space below the bottom shelf 400 of the shelving unit 130 in whichever direction (in the forward direction or in the backward direction) is free of obstacles.

When there are obstacles in both forward and backward directions, the conveyance controller 807 causes the autonomous vehicle 120 to stand by for a certain period of time, and confirms again whether or not there is an obstacle in a forward or backward direction. That is, the conveyance controller 807 alternately repeats the standby and the confirmation of the presence or absence of an obstacle in the front-rear direction.

Note that when it is confirmed that there are obstacles in both forward and backward directions even after repeating the confirmation and the standby a predetermined number of times, the conveyance controller 807 may cause the autonomous vehicle 120 to stand by on the spot. In the above description, the presence or absence of a forward or backward obstacle is confirmed after the release of docking. However, the autonomous vehicle 120 may be configured to stand by on the spot or exit the space in a predetermined direction immediately after the release of docking without confirming the presence or absence of an obstacle.

MODIFIED EXAMPLES

In the above embodiment, the conveyance target conveyed by the autonomous vehicle 120 is a caster-equipped shelving unit on which items or the like are placed. However, for example, the conveyance target may be a pot with casters, a home appliance with casters, or the like.

In the above embodiment, the autonomous vehicle 120 is docked with the caster-equipped shelving unit and conveys the caster-equipped shelving unit. However, the autonomous vehicle 120 may convey a conveyance target without docking therewith. For example, the autonomous vehicle 120 may be a robot including an arm and configured to convey the conveyance target by pushing, pulling, gripping, lifting, or the like using the arm and the like. The robot may be a robot configured to tow or lift, thereby conveying the conveyance target.

In the above embodiment, the autonomous vehicle 120 is an automatic guided vehicle configured to convey an item used by the user 110 to be within a grasping distance of the user 110 in response to a conveyance instruction given by the user 110. However, the task executed by the autonomous vehicle 120 is not limited to the conveyance of an item. The autonomous vehicle 120 may be, for example, a household robot configured to perform household tasks, such as cleaning, a transport robot configured to transport luggage, equipment, and the like in a factory, a warehouse, or the like, an automatic vehicle configured to travel on a public or private road, a transport drone configured to fly while holding an item or the like.

In the above embodiment, the marking provided to the shelving unit 130 is a total of four barcodes, i.e., two frontward ones and two rearward ones in the traveling direction. However, the number and disposition of the codes for the marking are not limited to these. For example, the marking may be only two frontward barcodes in the traveling direction. Further, for example, the marking may be one frontward barcode and one rearward barcode in the traveling direction.

In the above embodiment, the two barcodes disposed frontward in the traveling direction and arranged in the direction intersecting the traveling direction are such that the rightward one is the third and fourth digits from the back of the identification information and the leftward one is the first and second digits from the back of the identification information, but these may be reversed. That is, the rightward barcode may be the first and second digits from the back of the identification information, and the leftward barcode may be the third and fourth digits from the back of the identification information.

In the above embodiment, the autonomous vehicle 120 controls the conveyance of the shelving unit 130 by the autonomous vehicle 120 based on the identification information of the shelving unit 130. The control of the conveyance based on the identification information is a concept including the following as a non-limiting example. For example, the control includes determining, based on the identification information, whether or not the conveyance target is one identified based on the instruction of the user and conveying the conveyance target if the conveyance target is the identified one, and otherwise not conveying the conveyance target. Also, for example, the control includes not only the control during the conveyance but also the control related to the determination as to whether to convey. Further, for example, the control includes changing the conveyance condition based on the identification result. An example of the control of changing the conveyance condition is setting of a sensor invalid region.

In the above embodiment, the barcode is used as the marking provided to the conveyance target. However, the marking is not limited to the barcode. Given markings may be set such that the quantity of information obtained from a rearward marking in the entry direction is greater than the quantity of information obtained from a frontward marking in the entry direction. Such a marking may be provided to a conveyance target to be conveyed by means different from docking. That is, the same concept is applicable to an autonomous vehicle configured to convey a conveyance target by means different from docking.

In the above embodiment, the sensor invalid region identified based on the marking recognition result is set. However, the mode of the sensor invalid region may be changed in accordance with the marking recognition result. In this case, two or more modes in relation to the setting of the sensor invalid region may be set in advance, and one of the modes may be selected in accordance with the marking recognition result.

In the above embodiment, the sensor invalid region is set based on the marking recognition result. However, the setting other than the sensor invalid region may be changed as the conveyance condition. Examples of the conveyance condition other than the sensor invalid region include a sensor used during conveyance, an object recognition method, a conveyance speed, and the like.

In the above embodiment, the conveyance condition is changed based on the marking recognition result. However, the conveyance condition may be changed based on identification information based on one other than the marking. An example of the identification information based on one other than the marking is an electronic device capable of transmitting information, such as radio frequency identification (RFID). That is, an electronic device capable of transmitting information may be built in the conveyance target, and the conveyance condition of the conveyance target may be changed based on the result obtained by recognizing the electronic device with the autonomous vehicle.

In the above embodiment, all of the two or more markings provided to the conveyance target are of the same type. However, two or more markings including two or more types of markings may be provided to the conveyance target. For example, the frontward marking in the entry direction may be a barcode, and the rearward marking in the entry direction may be a two-dimensional code. Even when the frontward marking and the rearward marking are of different types, the quantity of information expressed by the frontward marking may be set to be smaller than the quantity of information expressed by the rearward marking.

In the above embodiment, the validity of the conveyance target is verified based on the marking recognition result. However, the validity of the conveyance target may be verified based on the object recognition result in addition to the marking recognition result.

SUMMARY

As is clear from the above description, the autonomous vehicle 120 according to the embodiment includes the one or more sensors configured to obtain one or more images of the conveyance target that includes one or more markings, and the controller 310 configured to control the autonomous vehicle 120. The controller 310 identifies the conveyance target based on the recognition result of the one or more markings included in the one or more images, and controls the conveyance of the conveyance target by the autonomous vehicle 120 based on the identification result of the conveyance target.

The autonomous vehicle 120 according to the embodiment is an autonomous vehicle configured to convey the conveyance target, and may include: a camera configured to obtain an image of the conveyance target; and a controller configured to identify the conveyance target based on two or more markings recognized from the image.

The controller 310 may determine whether or not the conveyance target is a conveyance target identified based on the instruction given by the user, based on the identification result.

The one or more markings may be disposed at positions at which the one or more images can be obtained using the sensor in the traveling direction in which the autonomous vehicle 120 brings the conveyance target into a conveyable state. The one or more markings may include: one or more markings disposed frontward in the traveling direction; and one or more markings disposed rearward in the traveling direction. The quantity of information obtained by recognizing the one or more markings disposed rearward in the traveling direction may be greater than the quantity of information obtained by recognizing the one or more markings disposed frontward in the traveling direction.

The controller 310 may determine whether or not the conveyance target matches the conveyance target identified using the recognition result of the one or more markings disposed frontward, and then determine whether or not the conveyance target matches the conveyance target identified using the recognition result of the one or more markings disposed rearward.

The controller 310 may determine whether to continue the control for causing the autonomous vehicle 120 to bring the conveyance target into a conveyable state, based on the recognition result of the one or more markings disposed frontward. The controller 310 may determine whether to continue the control for causing the autonomous vehicle 120 to bring the conveyance target into a conveyable state, based on the recognition result of the one or more markings disposed rearward.

The controller 310 may recognize a positional relationship with the conveyance target based on the recognition result of the one or more markings disposed frontward, and may perform control to move the autonomous vehicle in the traveling direction based on the positional relationship.

The one or more markings may include information other than the identification information of the conveyance target, and the controller 310 may control the conveyance of the conveyance target by the autonomous vehicle 120 using the information other than the identification information.

The controller 310 may partially invalidate data obtained by the one or more sensors included in the autonomous vehicle 120 based on the recognition result of the one or more markings, and may convey the conveyance target using the partially invalidated data. When a part of the conveyance target is in the measurement range of the one or more sensors, the controller 310 may invalidate data corresponding to the part of the conveyance target. The one or more sensors may be a sensor configured to obtain one or more images, a ToF camera, a LiDAR sensor, and a microphone.

The controller 310 may verify the validity of the identification information. The controller 310 may verify the validity by collating the identification information with the registered identification information of the conveyance target. The one or more markings may include a first marking and a second marking, and the controller 310 may verify the validity based on at least one of a relationship between information obtained by recognizing the first marking and information obtained by recognizing the second marking, and a distance between the first marking and the second marking.

The autonomous vehicle 120 may dock with the conveyance target and convey the conveyance target.

The display medium according to the embodiment is a display medium configured for a conveyance target to be conveyed by the autonomous vehicle 120 to include one or more markings. The one or more markings are formed on the display medium and include identification information of the conveyance target. The identification information is used for control of conveyance of the conveyance target by the autonomous vehicle 120.

The display medium according to the embodiment may be a display medium configured for the conveyance object to include: one or more markings disposed frontward in the traveling direction in which the autonomous vehicle 120 brings the conveyance object into a conveyable state; and one or more markings disposed rearward in the traveling direction in which the autonomous vehicle 120 brings the conveyance object into the conveyable state. The quantity of information obtained by the autonomous vehicle 120 that recognizes the one or more markings disposed rearward in the traveling direction may be greater than the quantity of information obtained by the autonomous vehicle 120 that recognizes the one or more markings disposed frontward in the traveling direction.

The display medium according to the embodiment may be a display medium configured for the conveyance target to include: a first marking and a second marking as the one or more markings disposed frontward; and a third marking and a fourth marking as the one or more markings disposed rearward. The first marking and the third marking are arranged along the traveling direction, and the second marking and the fourth marking are arranged along the traveling direction. The first marking and the second marking are arranged along a direction intersecting the traveling direction, and the third marking and the fourth marking are arranged along the direction intersecting the traveling direction.

The display medium according to the embodiment may be a display medium configured for the conveyance target to include one or more markings disposed frontward and one or more markings disposed rearward in a second traveling direction that is opposite to the traveling direction and in which the autonomous vehicle 120 brings the conveyance object into a state conveyable.

The conveyance object according to the embodiment is a conveyance object to be conveyed by the autonomous vehicle 120. The conveyance object includes one or more markings. The one or more markings include identification information of the conveyance object. The identification information is used for control of conveyance of the conveyance object by the autonomous vehicle 120.

The conveyance object according to the embodiment may include one or more markings disposed frontward and one or more markings disposed rearward in a direction for the autonomous vehicle 120 to be in a state capable of conveying the conveyance object. The quantity of information obtained by the autonomous vehicle 120 that recognizes the one or more markings disposed rearward may be greater than the quantity of information obtained by the autonomous vehicle 120 that recognizes the one or more markings disposed frontward.

The conveyance object according to the embodiment may include: a first marking and a second marking as the one or more markings disposed frontward; and a third marking and a fourth marking as the one or more markings disposed rearward. The first marking and the third marking are arranged along the traveling direction, and the second marking and the fourth marking are arranged along the traveling direction. The first marking and the second marking are arranged along a direction intersecting the traveling direction, and the third marking and the fourth marking are arranged along the direction intersecting the traveling direction.

The conveyance object according to the embodiment may include one or more markings disposed frontward and one or more markings disposed rearward in a second traveling direction that is opposite to the traveling direction and in which the autonomous vehicle 120 brings the conveyance object into a state conveyable.

The two or more markings may indicate different information. The markings may be such that the quantity of the information of at least one marking is different from the quantity of the information of another marking. The markings may indicate identification information for identifying the conveyance target. The markings may include information indicating a shape of the conveyance target. The information indicating the shape of the conveyance target includes at least one of the shape or the outer dimensions of the conveyance target, and may include other information.

The two or more markings may be displayed at predetermined positions of the conveyance target. The markings may be arranged at positions that are capturable by the front RGB camera 221 or the rear RGB camera 320 in the entry direction in which the autonomous vehicle 120 brings the shelving unit 130 into a conveyable state.

The two or more markings may include a first marking and a second marking. The first marking and the second marking may be arranged along the entry direction. The first marking and the second marking may be arranged along a direction intersecting the entry direction. The quantity of information of the second marking may be greater than the quantity of information of the first marking.

The two or more markings may include a first marking, a second marking, a third marking, and a fourth marking. The first marking and the second marking may be arranged along the entry direction, and the third marking and the fourth marking may be arranged along the entry direction. The first marking and the third marking may be arranged along a direction intersecting the entry direction, and the second marking and the fourth marking may be arranged along a direction intersecting the entry direction.

The quantity of information of the third marking may be greater than the quantity of information of the first marking. The quantity of information of the fourth marking may be greater than the quantity of information of the second marking.

The controller 310 included in the autonomous vehicle 120 may cause the autonomous vehicle 120 to travel in the entry direction upon recognizing the first marking and the second marking, and may generate identification information based on the two or more markings upon recognizing the third marking and the fourth marking from the image. The controller 310 included in the autonomous vehicle 120 may recognize the one or more markings disposed frontward in the entry direction and the one or more markings disposed rearward in the entry direction, and may control the autonomous vehicle 120 to move so as to bring the conveyance target into a conveyable state.

The controller 310 included in the autonomous vehicle 120 may recognize a positional relationship with the shelving unit 130 based on the first marking and the second marking, and may control the autonomous vehicle 120 to move in the entry direction based on the positional relationship. The controller 310 may recognize the positional relationship through triangulation using the first marking and the second marking.

The controller 310 included in the autonomous vehicle 120 may convey the shelving unit 130 based on the information of the shelving unit 130 identified based on the two or more markings. The information of the shelving unit 130 may be information indicating the shape of the shelving unit 130. The information of the shelving unit 130 may be information in relation to processing of an image.

The autonomous vehicle 120 may further include a sensor configured to obtain data in relation to an object within a measurement range. When a part of the shelving unit 130 is in the measurement range, the controller 310 may invalidate data in relation to the position of that part of the shelving unit 130 based on the information of the shelving unit 130. The sensor may be a camera, a ToF camera, a LiDAR device, and a microphone.

The controller 310 included in the autonomous vehicle 120 may verify the validity of the identification information. The controller 310 may collate the identification information with the registered identification information of the shelving unit 130.

The conveyance object according to the embodiment is the shelving unit 130 to be conveyed by the autonomous vehicle 120, and includes two or more markings displayed at positions that are capturable by a camera included in the autonomous vehicle 120 in the entry direction of the autonomous vehicle 120.

The display medium according to the embodiment includes a marking displayed, in the shelving unit 130 to be conveyed by the autonomous vehicle 120, at a position that is capturable by a camera included in the autonomous vehicle 120 in the entry direction of the autonomous vehicle 120.

Thus, according to an embodiment of the present disclosure, it is possible to provide an autonomous vehicle that can readily obtain information on the conveyance target.

Therefore, according to an embodiment of the present disclosure, the shape, the outer dimensions, and the like of the conveyance target can be identified. Thus, even if the autonomous vehicle 120 is docked with the shelving unit 130, it is possible to avoid collision with surrounding objects and efficiently convey the conveyance target.

Further, according to an embodiment of the present disclosure, the invalid region is set in the information obtained by the sensor based on information (e.g., specification and the like) in relation to the conveyance target. Thus, after the shelving unit 130 is detected by the sensor, an appropriate operation can be executed.

According to an embodiment of the present disclosure, unique identification information is assigned to the conveyance-target shelving unit.

Thus, it is verified whether or not the identification information is valid, and a false counterfeit or the like can be detected.

Further, according to an embodiment of the present disclosure, the intended concept can be realized by displaying the optically recognizable marking on the conveyance target. Thus, it is possible to identify the conveyance target conveniently and inexpensively.

OTHER EMBODIMENTS

A part or all of the controller 310 in the above-described embodiment may be configured by hardware, or may be configured by information processing of software (program) executed by a central processing unit (CPU), a graphics processing unit (GPU), or the like. In the case of being configured by information processing of software, software that realizes at least a part of the functions of the controller 310 in the above-described embodiment may be stored in a non-transitory storage medium, such as a compact disc-read only memory (CD-ROM), a universal serial bus (USB) memory, or the like, and at least one processor may read the software to execute information processing of the software. The software may be downloaded via a communication network. Furthermore, all or a part of the processing of software may be implemented in a circuit, such as an application specific integrated circuit (ASIC), a field programmable gate array (FPGA), or the like, and information processing by the software may be executed by hardware.

The storage medium storing the software may be a removable medium, such as an optical disk, or a fixed storage medium, such as a hard disk or a memory. The storage medium may be provided in the interior of the controller 310 (a main storage device, an auxiliary storage device, or the like), or may be provided in the controller 310.

Figure 19:
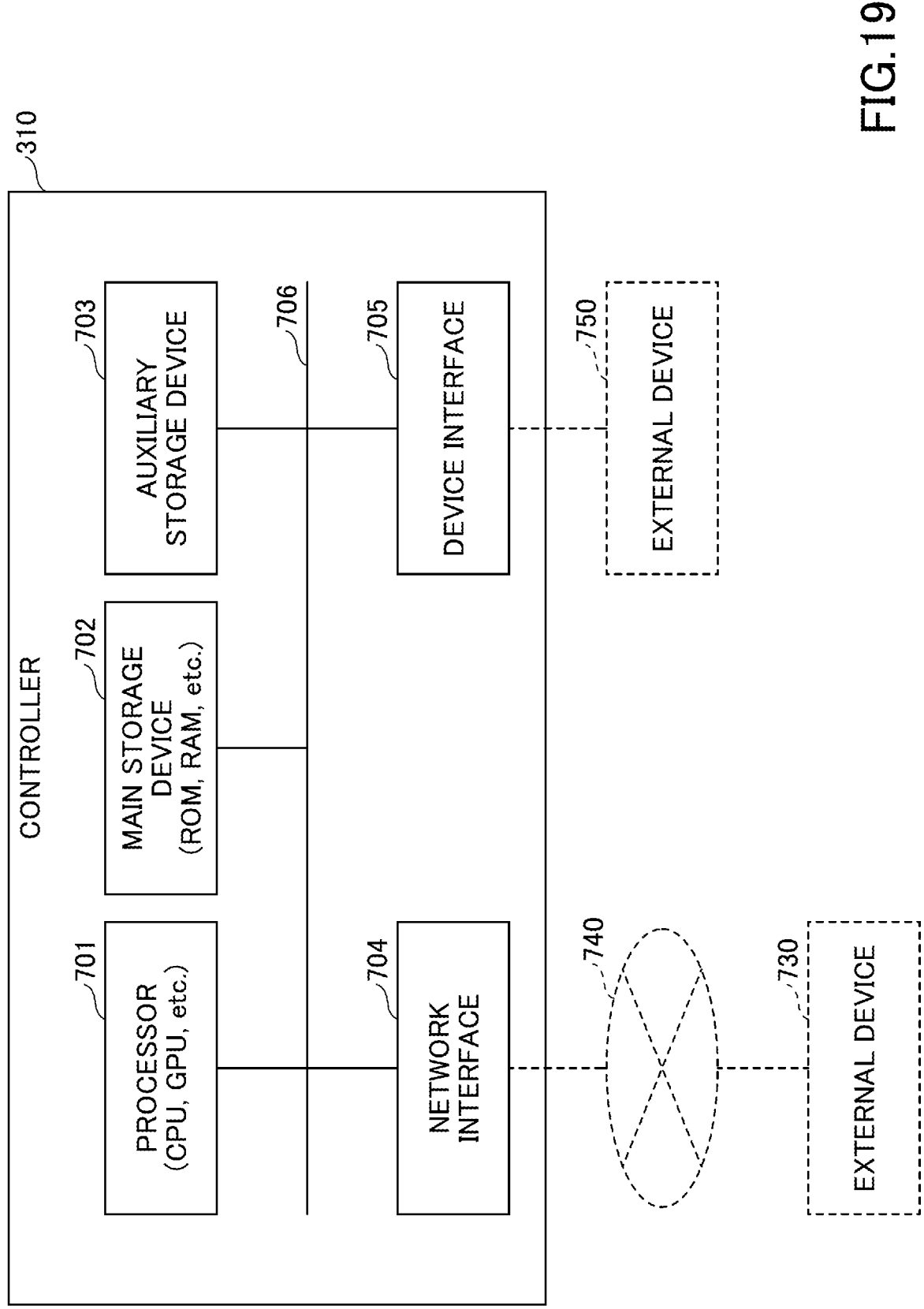
FIG. 19 is a block diagram illustrating an example of a hardware configuration of the controller.

FIG. 19 is a block diagram illustrating an example of the hardware configuration of the controller 310. The controller 310 may be implemented, for example, as a computer that includes a processor 701, a main storage device 702 (memory), an auxiliary storage device 703 (memory), a network interface 704, and a device interface 705, which are connected via a bus 706.

The controller 310 of FIG. 19 includes each of components by one, but may include two or more same components.

Various calculations of the controller 310 may be executed by parallel processing using one or more processors or using two or more computers connected via a network. Further, various calculations may be distributed to two or more calculation cores in the processor 701 and executed by parallel processing. In addition, a part or all of the processes, means, and the like of the present disclosure may be realized by at least one of a processor and a storage device provided on the Cloud capable of communicating with the controller 310 via the network interface 704.

The processor 701 may be an electronic circuit (a process circuit, a processing circuit, a processing circuitry, a CPU, a GPU, a FPGA, an ASIC, or the like) that performs at least one of control and calculation of the controller 310. The processor 701 may be a general-purpose processor, a dedicated processing circuit designed to execute a specific calculation, and a semiconductor device including both the general-purpose processor and the dedicated processing circuit. The processor 701 may include an optical circuit or may include a calculation function based on quantum computing.

The processor 701 may perform calculation based on data or software input from each device or the like of the internal configuration of the controller 310, and may output a calculation result or a control signal to each device or the like. The processor 701 may control each component of the controller 310 by executing an operating system (OS) of the controller 310, an application, or the like.

The controller 310 may be implemented by one or more processors 701. The processor 701 may refer to one or more electronic circuits disposed on one chip, or may refer to one or more electronic circuits disposed on two or more chips or two or more devices. When two or more electronic circuits are used, the electronic circuits may communicate with each other in a wired or wireless manner.

The main storage device 702 may store instructions for executing the processor 701, various data, and the like, and information stored in the main storage device 702 may be read out by the processor 701. The auxiliary storage device 703 is a storage device other than the main storage device 702. Note that these storage devices mean given electronic components capable of storing electronic information, and may be semiconductor memories. The semi-conductor memory may be either a volatile memory or a non-volatile memory. The storage device for storing various data and the like in the controller 310 in the above-described embodiment may be realized by the main storage device 702 or the auxiliary storage device 703, or may be realized by an internal memory built in the processor 701. For example, the conveyance target storage part 810 or the environment map storage part 811 in the above-described embodiment may be realized by the main storage device 702 or the auxiliary storage device 703.

When the controller 310 is configured by at least one storage device (memory) and at least one processor connected (coupled) to the at least one storage device, at least one processor may be connected to one storage device. At least one storage device may be connected to one processor.

Further, the configuration may include a configuration in which at least one processor of the two or more processors is connected to at least one storage device of the two or more storage devices. A configuration in which the storage device is integrated with the processor (e.g., cache memories including a L1 cache and a L2 cache) may be included.

The network interface 704 is an interface for connecting to a communication network 740 in a wireless or wired manner. The network interface 704 may be an appropriate interface, such as an interface conforming to an existing communication standard. The network interface 704 may exchange information with an external device 730 connected via the communication network 740. The communication network 740 may be, for example, a wide area network (WAN), a local area network (LAN), a personal area network (PAN), or any combination thereof, and may be a given network in which information is exchanged between the controller 310 and the external device 730. Examples of the WAN include the Internet and the like. Examples of the LAN include IEEE802.11, Ethernet (registered trademark), and the like. Examples of the PAN include Bluetooth (registered trademark), near field communication (NFC), and the like.

The device interface 705 is an interface, such as a USB that is directly connected to an external device 750.

An external device 730 is a device connected to the controller 310 via a network. The external device 730 may be, for example, an information process terminal of the user 110 or an external server that stores various information used by the autonomous vehicle 120. The external device 750 is a device that is directly connected to the controller 310.

The external device 730 or the external device 750 may be, for example, an input device. The input device is, for example, a device, such as a camera, a microphone, a motion capture, various sensors, a keyboard, a mouse, a touch panel, or the like, and provides obtained information to the controller 310. The external device 730 or the external device 750 may also be, for example, a device including an input part, a memory, and a processor, such as a personal computer, a tablet terminal, a smartphone, or the like.

In the present embodiment, the input device is an electronic device, such as a camera (the front RGB camera 221, the ToF camera 222, or the rear RGB camera 320), a microphone (the microphones 301 to 304), various sensors (the LiDAR device 212), or the like, and gives obtained information to the controller 310.

The external device 730 or the external device 750 may be a storage device (memory). For example, the external device 730 may be a network storage or the like, and the external device 750 may be a storage, such as an HDD or the like.

The external device 730 or the external device 750 may be a device having a function of a part of the components of the controller 310. That is, the controller 310 may transmit a part or all of the processing results to the external device 730 or the external device 750, or may receive a part or all of the processing results from the external device 730 or the external device 750.

In the present specification (including the claims), if the expression "at least one of a, b, and c" or "at least one of a, b, or c" is used (including similar expressions), any one of a, b, c, a-b, a-c, b-c, or a-b-c is included. Multiple instances may also be included in any of the elements, such as a-a, a-b-b, and a-a-b-b-c-c. Further, the addition of another element other than the listed elements (i.e., a, b, and c), such as adding d as a-b-c-d, is included.

In the present specification (including the claims), in a case in which an expression such as "data as an input", "using data", "based on data", "according to data", or "in accordance with data" (including similar expressions) is used, such a case may, unless otherwise noted, encompass a case in which data themselves are used and a case in which data obtained by processing data (e.g., data obtained by adding noise, normalized data, feature extracted from data, and intermediate representation of data) are used. If it is described that any result can be obtained "based on data as an input", "using data", "based on data", "according to data", or "in accordance with data" (including similar expressions), unless otherwise noted, a case in which the result is obtained based on only the data is included, and a case in which the result is obtained affected by another data other than the data, factors, conditions, and/or states is included. If it is described that "data are output" (including similar expressions), unless otherwise noted, a case in which data themselves are used as an output is included, and a case in which data obtained by processing data in some way (e.g., data obtained by adding noise, normalized data, feature extracted from data, and intermediate representation of various data) are used as an output is included.

In the present specification (including the claims), if the terms "connected" and "coupled" are used, the terms are intended as non-limiting terms that include any of direct, indirect, electrically, communicatively, operatively, and physically connected/coupled. Such terms should be interpreted according to a context in which the terms are used, but a connected/coupled form that is not intentionally or naturally excluded should be interpreted as being included in the terms without being limited.

In the present specification (including the claims), if the expression "A configured to B" is used, a case in which a physical structure of the element A has a configuration that can perform the operation B, and a permanent or temporary setting/configuration of the element A is configured/set to actually perform the operation B may be included. For example, if the element A is a general-purpose processor, the processor may have a hardware configuration that can perform the operation B and be configured to actually perform the operation B by setting a permanent or temporary program (i.e., an instruction). If the element A is a dedicated processor or a dedicated arithmetic circuit, a circuit structure or the like of the processor may be implemented so as to actually perform the operation B irrespective of whether the control instruction and the data are actually attached.

In the present specification (including the claims), if a term indicating containing or possessing (e.g., "comprising/including" and "having") is used, the term is intended as an open-ended term, including an inclusion or possession of an object other than a target object indicated by the object of the term. If the object of the term indicating an inclusion or possession is an expression that does not specify a quantity or that suggests a singular number (i.e., an expression using "a" or "an" as an article), the expression should be interpreted as being not limited to a specified number.

In the present specification (including the claims), even if an expression such as "one or more" or "at least one" is used in a certain description, and an expression that does not specify a quantity or that suggests a singular number (i.e., an expression using "a" or "an" as an article) is used in another description, it is not intended that the latter expression indicates "one". Generally, an expression that does not specify a quantity or that suggests a singular number (i.e., an expression using "a" or "an" as an article) should be interpreted as being not necessarily limited to a particular number.

In the present specification, if it is described that a particular advantage/result is obtained in a particular configuration included in an embodiment, unless there is a particular reason, it should be understood that that the advantage/result may be obtained in another embodiment or other embodiments including the configuration. It should be understood, however, that the presence or absence of the advantage/result generally depends on various factors, conditions, states, and/or the like, and that the advantage/result is not necessarily obtained by the configuration. The advantage/result is merely an advantage/result that results from the configuration described in the embodiment when various factors, conditions, and/or states are satisfied, and is not necessarily obtained in the claimed invention that defines the configuration or a similar configuration.

In the present specification (including the claims), if multiple hardware performs predetermined processes, each of the hardware may cooperate to perform the predetermined processes, or some of the hardware may perform all of the predetermined processes. Additionally, some of the hardware may perform some of the predetermined processes while other hardware may perform the remainder of the predetermined processes. In the present specification (including the claims), if an expression such as "one or more hardware perform a first process and the one or more hardware perform a second process" (including similar expressions) is used, the hardware that performs the first process may be the same as or different from the hardware that performs the second process. That is, the hardware that performs the first process and the hardware that performs the second process may be included in the one or more hardware. The hardware may include an electronic circuit, a device including an electronic circuit, or the like.

In the present specification (including the claims), if multiple storage devices (memories) store data, each of the multiple storage devices may store only a portion of the data or may store an entirety of the data. Also, a configuration in which some of the multiple storage devices store data may be included.

Although the embodiments of the present disclosure have been described in detail above, the present disclosure is not limited to the individual embodiments described above. Various additions, modifications, substitutions, partial deletions, and the like may be made without departing from the conceptual idea and spirit of the invention derived from the contents defined in the claims and the equivalents thereof. For example, in the embodiments described above, when numerical values or mathematical formulae are used for description, these are used for illustrative purposes and do not limit the scope of the present disclosure. Additionally, the orders of operations described in the embodiments are illustrative and do not limit the scope of the present disclosure.

What is claimed is:

1. An autonomous vehicle, comprising:
one or more sensors configured to obtain one or more images of a conveyance target that includes one or more markings; and
a controller configured to control the autonomous vehicle, the controller including one or more processors, and one or more memories storing one or more programs, which when executed, cause the one or more processors to:
identify the conveyance target based on a recognition result of the one or more markings included in the one or more images, and
control conveyance of the conveyance target by the autonomous vehicle based on an identification result of the conveyance target.

2. The autonomous vehicle according to claim 1, wherein the one or more programs, when executed, cause the one or more processors to:
determine, based on the identification result, whether or not the conveyance target is a conveyance target identified based on an instruction given by a user.

3. The autonomous vehicle according to claim 1, wherein the one or more markings are disposed at one or more positions at which the one or more images are capturable by the one or more sensors in a traveling direction of the autonomous vehicle in which the autonomous vehicle brings the conveyance target into a conveyable state, and
the one or more markings include
one or more markings disposed frontward in the traveling direction, and
one or more markings disposed rearward in the traveling direction.

4. The autonomous vehicle according to claim 3, wherein a quantity of information obtained by recognizing the one or more markings disposed rearward is greater than a quantity of information obtained by recognizing the one or more markings disposed frontward.

5. The autonomous vehicle according to claim 3, wherein the one or more programs, when executed, cause the one or more processors to:
determine, based on the recognition result of the one or more markings disposed frontward, whether or not the conveyance target matches a conveyance target identified based on an instruction given by a user, and then
determine, based on the recognition result of the one or more markings disposed rearward, whether or not the conveyance target matches the identified conveyance target.

6. The autonomous vehicle according to claim 3, wherein the one or more programs, when executed, cause the one or more processors to:
determine, based on the recognition result of the one or more markings disposed frontward, whether to continue control for causing the autonomous vehicle to bring the conveyance target into the conveyable state.

7. The autonomous vehicle according to claim 3, wherein the one or more programs, when executed, cause the one or more processors to:
recognize a positional relationship with the conveyance target based on the recognition result of the one or more markings disposed frontward, and
perform control to move the autonomous vehicle in the traveling direction based on the positional relationship.

8. The autonomous vehicle according to claim 1, wherein the one or more programs, when executed, cause the one or more processors to:
partially invalidate data obtained by the one or more sensors included in the autonomous vehicle based on the recognition result of the one or more markings, and
convey the conveyance target using the partially invalidated data.

9. The autonomous vehicle according to claim 8, wherein the one or more programs, when executed, cause the one or more processors to:
in a case in which a part of the conveyance target is in a measurement range of the one or more sensors, invalidate the data corresponding to the part of the conveyance target.

10. The autonomous vehicle according to claim 1, wherein
the one or more programs, when executed, cause the one or more processors to:
collate identification information based on the recognition result with registered identification information of the conveyance target.

11. The autonomous vehicle according to claim 1, wherein the one or more markings include a first marking and a second marking, and the one or more programs, when executed, cause the one or more processors to:

verify validity of identification information based on the recognition result based on at least one of:

a relationship between information obtained by recognizing the first marking and information obtained by recognizing the second marking; or a distance between the first marking and the second marking.

12. The autonomous vehicle according to claim 1, wherein the autonomous vehicle docks with the conveyance target and conveys the conveyance target.

13. A conveyance object, which is configured to be conveyed by the autonomous vehicle of claim 12, the conveyance object comprising:

one or more markings, wherein the one or more markings include identification information of the conveyance object, and the identification information is used for control of conveyance of the conveyance object by the autonomous vehicle.

14. The conveyance object according to claim 13, wherein the one or more markings include one or more markings disposed frontward and one or more markings disposed rearward in a traveling direction of the autonomous vehicle in which the autonomous vehicle brings the conveyance object into a conveyable state.

15. The conveyance object according to claim 14, wherein a quantity of information obtained by the autonomous vehicle that recognizes the one or more markings disposed rearward is greater than a quantity of information obtained by the autonomous vehicle that recognizes the one or more markings disposed frontward.

16. The conveyance object according to claim 14, wherein the one or more markings disposed frontward include a first marking and a second marking, the one or more markings disposed rearward include a third marking and a fourth marking the first marking and the third marking are arranged along the traveling direction, the second marking and the fourth marking are arranged along the traveling direction, the first marking and the second marking are arranged along a direction intersecting the traveling direction, and the third marking and the fourth marking are arranged along the direction intersecting the traveling direction.

17. The conveyance object according to claim 14, wherein the one or more markings include one or more markings disposed frontward and one or more markings disposed rearward in a second traveling direction that is opposite to the traveling direction and in which the autonomous vehicle brings the conveyance object into the conveyable state.

18. A control method for an autonomous vehicle, the control method comprising:

obtaining, by one or more sensors included in the autonomous vehicle, one or more images of a conveyance target that includes one or more markings;

identifying, by one or more processors, the conveyance target based on a recognition result of the one or more markings included in the one or more images; and controlling, by the one or more processors, conveyance of the conveyance target by the autonomous vehicle based on an identification result of the conveyance target.

19. The control method for the autonomous vehicle according to claim 18, wherein the one or more markings are disposed at one or more positions at which the one or more images are capturable by the one or more sensors in a traveling direction of the autonomous vehicle in which the autonomous vehicle brings the conveyance target into a conveyable state, and the one or more markings include one or more markings disposed frontward in the traveling direction, and one or more markings disposed rearward in the traveling direction.

20. The control method for the autonomous vehicle according to claim 18, wherein the one or more processors partially invalidate data obtained by the one or more sensors included in the autonomous vehicle based on the recognition result of the one or more markings, and control the conveyance of the conveyance target by the autonomous vehicle using the partially invalidated data.

* * * * *